United States Patent [19]

Nishimoto et al.

[11] 4,059,139

[45] Nov. 22, 1977

[54] TIRE FINISHING APPARATUS

[75] Inventors: Kichinosuke Nishimoto, Higashimurayama; Seiichiro Nishimura, Shakujii, both of Japan

[73] Assignee: Bridgestone Tire Company Limited, Tokyo, Japan

[21] Appl. No.: 671,813

[22] Filed: Mar. 30, 1976

[30] Foreign Application Priority Data

| Apr. 4, 1975 | Japan | 50-41539 |
| May 22, 1975 | Japan | 50-61276 |
| June 10, 1975 | Japan | 50-69959 |

[51] Int. Cl.² .......................................... B29H 17/40
[52] U.S. Cl. ............................................... 157/13
[58] Field of Search ......................................... 157/13

[56] References Cited

U.S. PATENT DOCUMENTS

| 2,524,489 | 10/1950 | Strong | 157/13 |
| 2,815,073 | 12/1957 | Wikle et al. | 157/13 |
| 3,075,574 | 1/1963 | Groves et al. | 157/13 |
| 3,832,972 | 9/1974 | Pace | 157/13 X |
| 3,929,043 | 12/1975 | Nishimura | 157/13 X |
| 3,952,892 | 4/1976 | Robinson et al. | 157/13 X |

Primary Examiner—James L. Jones, Jr.
Assistant Examiner—James G. Smith

[57] ABSTRACT

A tire finishing apparatus for trimming and removing spews formed on the outer peripheral wall of a cured tire during a vulcanizing process, comprising: a tire holding mechanism holding the outer peripheral wall of the tire with its rotational axis being substantially horizontal to prevent the tire from being vibrated during rotation thereof; a tire rotating mechanism rotating the tire about its rotational axis while being held by the tire holding mechanism; and a spew trimming cutter mechanism movable toward and away from the outer peripheral wall of the tire to trimmingly cut and remove the spews on the outer peripheral wall of the tire during rotation of the tire by the tire rotating mechanism.

15 Claims, 30 Drawing Figures

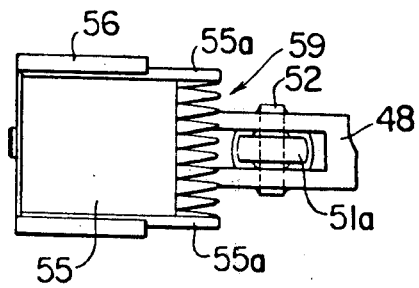
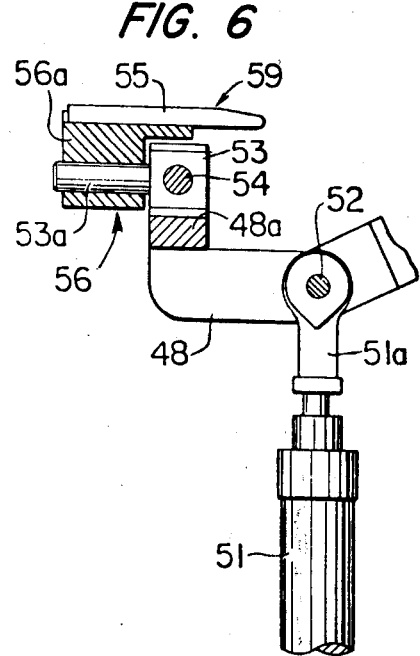
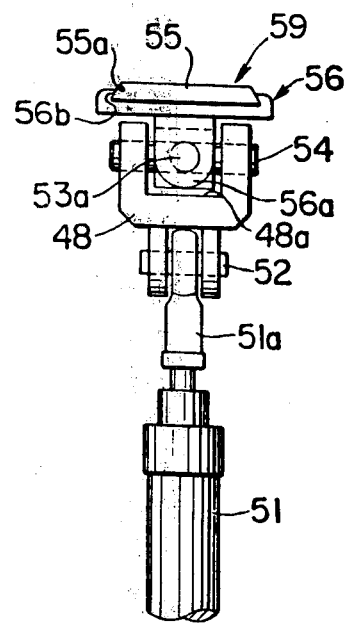

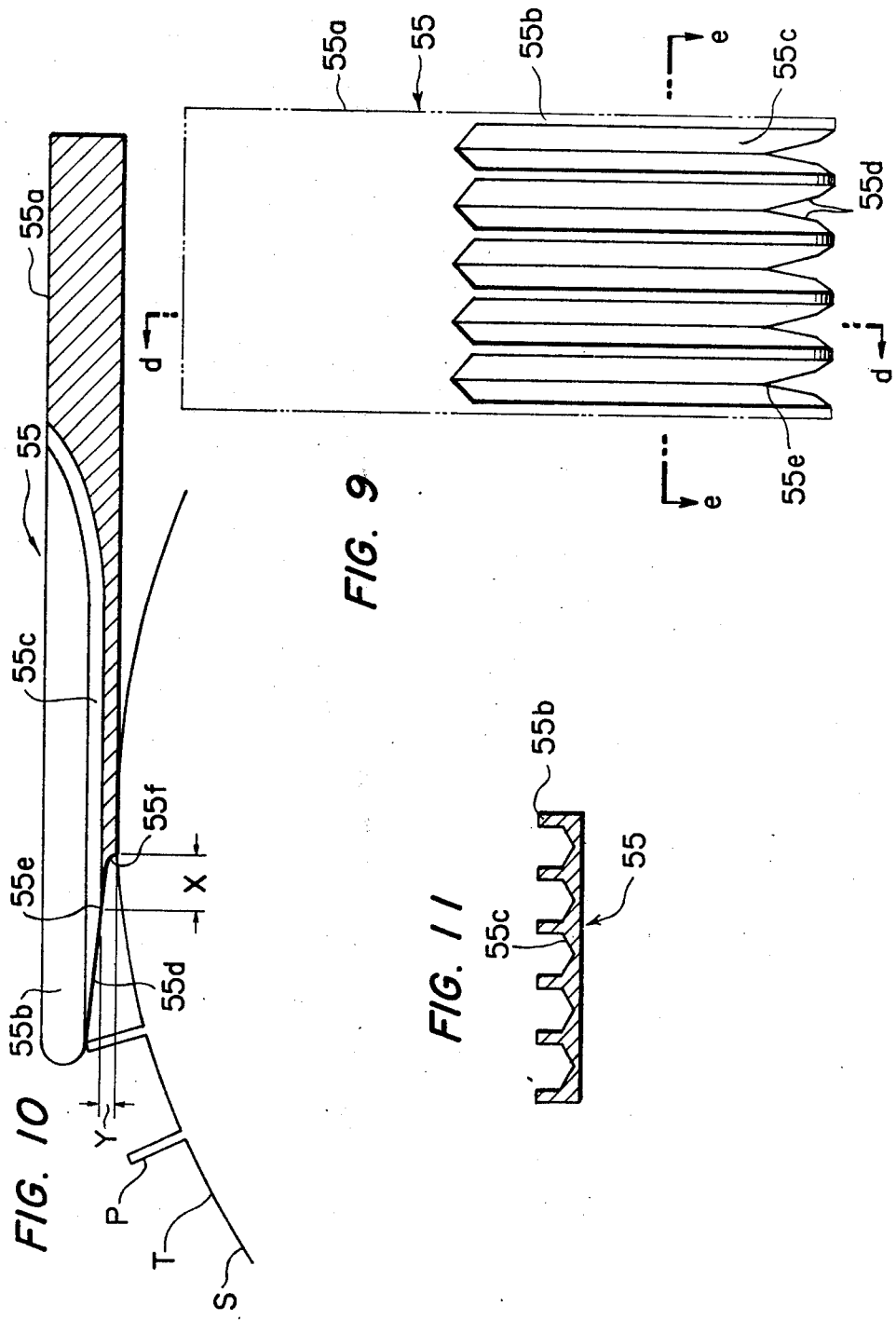

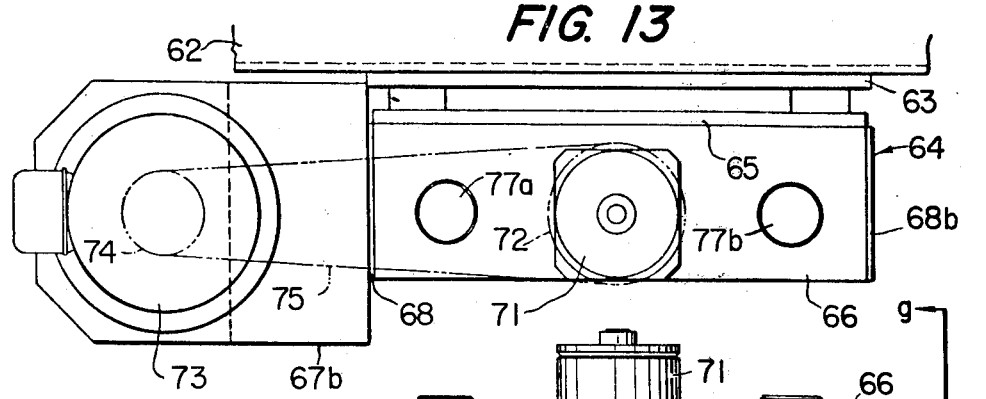
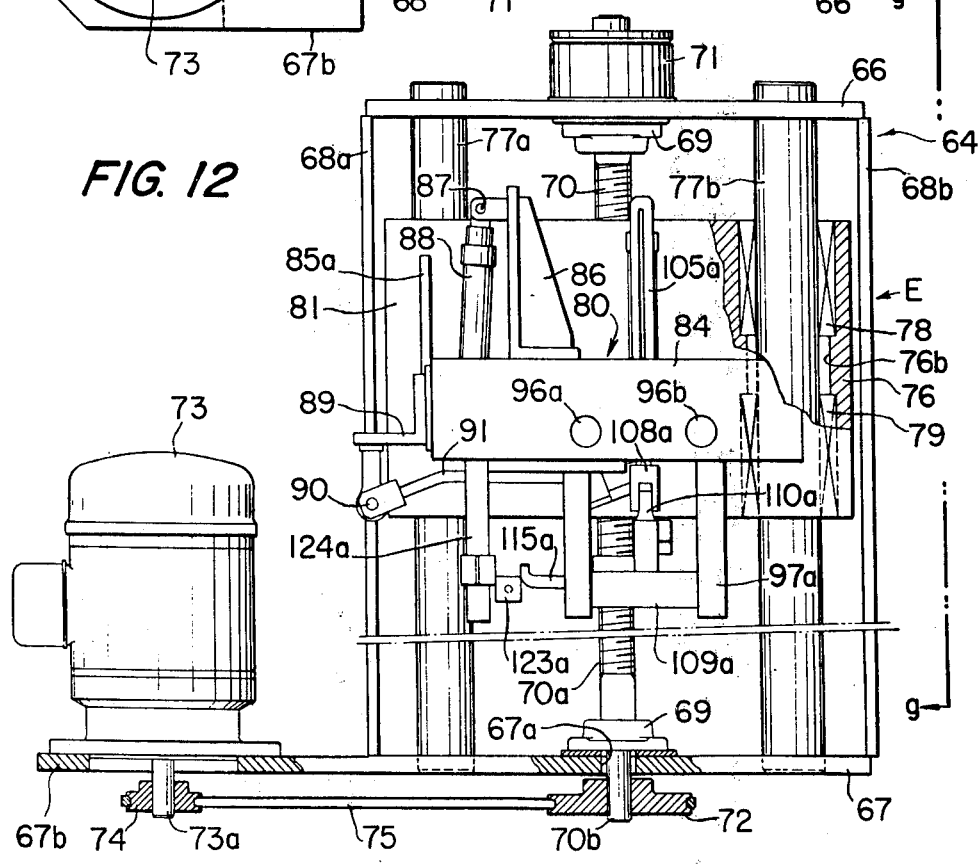

TIRE FINISHING APPARATUS

FIELD OF THE INVENTION

This invention relates to production of automobile tires and, more particularly, to a tire finishing apparatus for trimming and removing small protrusions such as spews and fin formed on the outer peripheral wall of a cured tire during a vulcanizing process.

BACKGROUND

As is well known, there are formed a number of spews on the outer peripheral wall of the cured tire during the vulcanizing process since molded rubber enters a number of air evacuating bores formed in a tire mold for evacuating air entrapped between the outer peripheral wall of the tire and the inner surface of the mold. It is also well known that there is formed an annular fin on the central tread surface of the cured tire during the vulcanizing process since molded rubber enters an annular gap formed between upper and lower mold sections which constitute the tire mold. The foregoing spews and fin are collectively referred to as "spews" in the following description of the specification. Conventionally, an attendant operator mannually handled a trimming cutter to trim and remove such spews, which operation not only necessitated extremely high skill but also decreased workability, resulting in decreasing operational efficiency of a tire finishing operation. Furthermore, the trimming cutter frequently damaged the outer peripheral wall of the tire and injured the operator.

SUMMARY OF THE INVENTION

It is therefore a primary object of the present invention to provide a tire finishing apparatus which overcomes the foregoing drawbacks.

It is another object of the present invention to provide a tire finishing apparatus which is automatically operated to trim and remove the spews on the outer peripheral wall of the tire.

It is a further object of the present invention to provide a tire finishing apparatus which is adapted to readily cut and removed the spews on various tires with different sizes.

According to the present invention, a tire finishing apparatus for trimming and removing spews formed on the outer peripheral wall of a cured tire during a vulcanizing process, comprising; a tire holding mechanism including at least three rollers to be in contact with the outer peripheral wall of the tire with its rotational axis being substantially horizontal to prevent the tire from being vibrated during rotation thereof; a tire rotating mechanism driving at least one of the rollers of the tire holding mechanism to rotate the tire about its rotational axis while being held by the tire holding mechanism; and a spew trimming cutter mechanism including a tread spew trimming cutter arrangement disposed opposingly to the tread surface of the tire and having at least a tread spew trimming cutter in the form of a substantially comb, the tread spew trimming cutter arrangement being adapted to permit the tread spew trimming cutter to be pressingly contactable with the tread surface of the tire and to move the tread spew trimming cutter along the tread surface of the tire; and a pair of side wall spew trimming cutter arrangements each disposed opposingly to each of the side wall surfaces of the tire and each having at least a side wall spew trimming cutter in the form of a substantially comb, each of the side wall spew trimming cutter arrangements being adapted to permit each of the side wall spew trimming cutters to be pressingly contactable with each of the side wall surfaces of the tire and to move the side wall spew trimming cutter along the side wall surface of the tire.

The tire holding mechanism may include a pair of tire receiving rollers disposed in spaced relation to each other along the tread surface of the tire and each having a rotational axis substantially parallel to the rotational axis of the tire, one of the tire receiving rollers being driven to rotate by the tire rotating mechanism; a pair of tire pressing rollers disposed above the tire receiving rollers and in spaced relation with each other and movable toward and away from the tire receiving rollers to be brought into contact with the outer peripheral wall of the tire for preventing the tire from its up and down motion during rotation thereof in cooperation with the tire receiving rollers and each having a rotational axis substantially parallel to the rotational axis of the tire; two pairs of tire centering rollers including a first pair of tire centering rollers and a second pair of tire centering rollers disposed in spaced relation with the first pair of tire centering rollers along the outer peripheral wall of the tire, each pair of the first and second pairs of tire centering rollers being disposed spacedly and opposingly to each other along the rotational axis of the tire and being movable toward and away from each other to be brought into contact with the side walls of the tire for preventing the equatorial plane of the tire from being vibrated during rotation thereof, and each of the tire centering rollers having a rotational axis substantially parallel with a radial direction of the tire; a pair of tire pressing roller actuator means for moving the tire pressing rollers toward and away from the tire receiving rollers; first tire centering roller actuator means for moving the first pair of tire centering rollers toward and away from each other; and second tire centering roller actuator means for moving the second pair of tire centering rollers toward and away from each other.

BRIEF DESCRIPTION OF THE DRAWING

The features and advantages of the apparatus in accordance with the present invention will become more apparent from the following description taken in conjunction with the accompanying drawings, in which:

FIG. 6 is an enlarged fragmentary side elevational view, partly in section, showing a first tread spew trimming cutter arrangement constituting a part of the preferred embodiment of the present invention;

FIG. 7 is an enlarged fragmentary plan view of the first tread spew trimming cutter arrangement shown in FIG. 6;

FIG. 8 is an enlarged fragmentary front elevational view as seen from the left of the first tread spew trimming cutter arrangement shown in FIG. 6;

FIG. 9 is an enlarged plan view of a first tread spew trimming cutter provided in the first tread spew trimming cutter arrangement shown in FIGS. 6 to 8;

FIG. 10 is a cross-sectional view taken along the lines d—d in FIG. 9;

FIG. 11 is a cross-sectional view taken along the lines e—e in FIG. 9;

FIG. 12 is an enlarged fragmentary elevational view, partly in section, as seen from the lines f—f in FIG. 2;

FIG. 13 is a plan view as seen from the upper position in FIG. 12;

DETAILED DESCRIPTION

Figure 1:
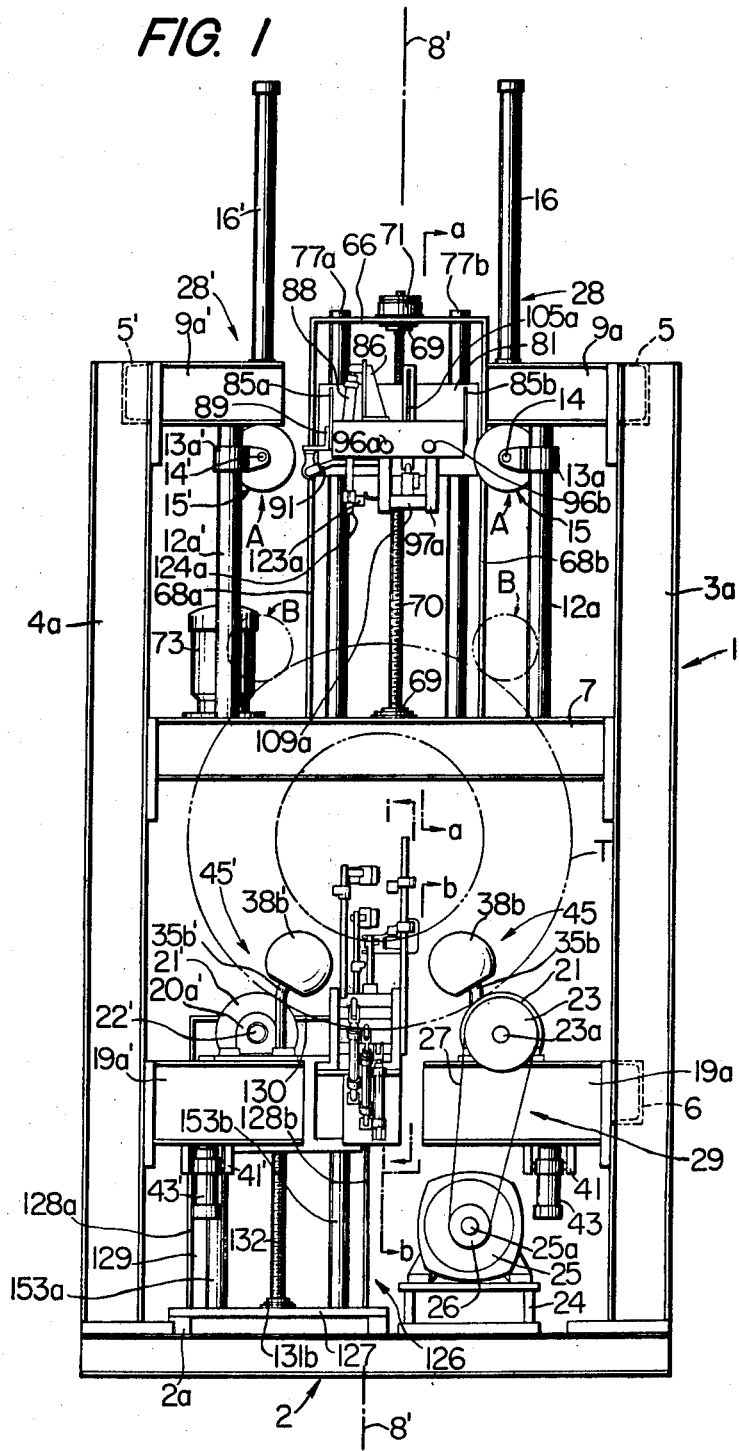
FIG. 1 is a front elevational view of a preferred embodiment of the apparatus according to the present invention.
Figure 2:
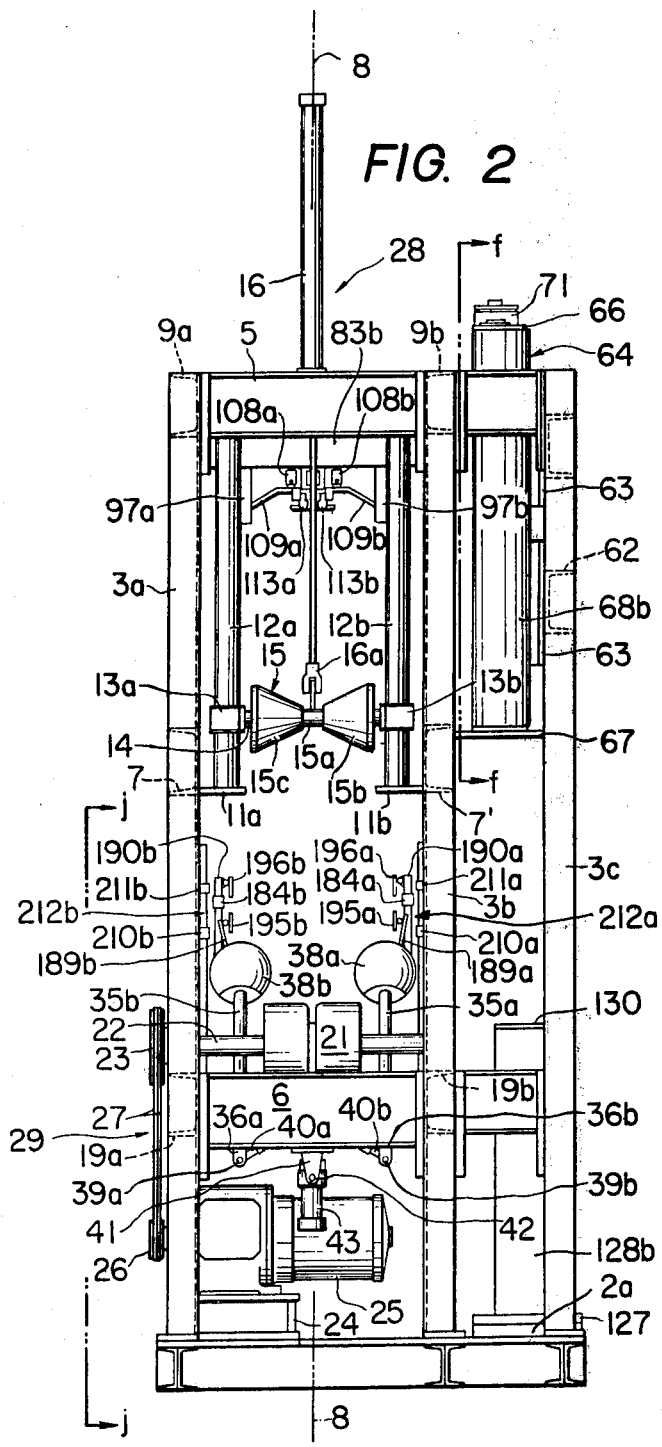
FIG. 2 is a side elevational view as seen from the right of the preferred embodiment of the apparatus shown in FIG. 1 but showing a pressing roller assuming a descended position.

With reference to the drawings and particularly to FIGS. 1 and 2, a tire finishing apparatus embodying the present invention is shown comprising a stationary frame structure, generally designated at 1, which includes a base plate structure 2, fore columns 3a, 3b and 3c substantially vertically and securely mounted on the forward end of the base plate structure 2 in alignment and spaced relation with each other, and rear columns 4a, 4b and 4c substantially vertically and securely mounted on the rear end of the base plate structure 2 in alignment and spaced relation with each other and further in spaced and opposing relation with the fore columns 3a, 3b and 3c, respectively. The rear columns 4b and 4c, however, are not illustrated in the drawings. The term "forward end" is intended to mean a "forward terminal end" of the tire finishing apparatus in the movement direction of a tire T to be finished, while the term "rear end" is likewise intended to mean a "rear terminal end" of the tire finishing apparatus in the movement direction of the tire T. In addition, the terms "fore" and "rear" are intended to indicate "fore portion" and "rear portion", respectively, of the tire finishing apparatus in the movement direction of the tire T. The stationary frame structure 1 further includes a horizontal upper fore beam 5 having both longitudinal ends securely connected to the upper terminal ends of the fore columns 3a and 3b in parallel with the base plate structure 2, a horizontal lower fore beam 6 having both longitudinal ends securely connected to the lower portions of the fore columns 3a and 3b in parallel with the base plate structure 2, an additional horizontal upper rear beam 5' having both longitudinal ends securely connected to the upper terminal ends of the rear columns 4a and 4b in parallel with the base structure 2, an intermediate side beam 7 having both longitudinal ends securely connected to the longitudinally intermediate portions of the fore and rear columns 3a and 4a in parallel with the base plate structure 2, and an additional intermediate side beam 7' having both longitudinal ends securely connected to the longitudinally intermediate portions of the fore and rear columns 3b' and 4b' in parallel with the base plate structure 2.

For simplifying the following description, a first equatorial plane 8 of the stationary frame structure 1 is tentatively defined to mean a vertical plane connecting a fore center line equally spaced inwardly from the fore columns 3a and 3b with a rear center line equally spaced inwardly from the rear columns 4a and 4b. A second equatorial plane 8' of the stationary frame structure 1 is also tentatively defined to mean a vertical plane connecting a side center line equally spaced inwardly from the fore column 3a and the rear column 4a with an additional side center line equally spaced inwardly from the fore column 3b and the rear column 4b, so that the second equatorial plane 8' is substantially at right angles to the first equatorial plane 8.

Figure 3:
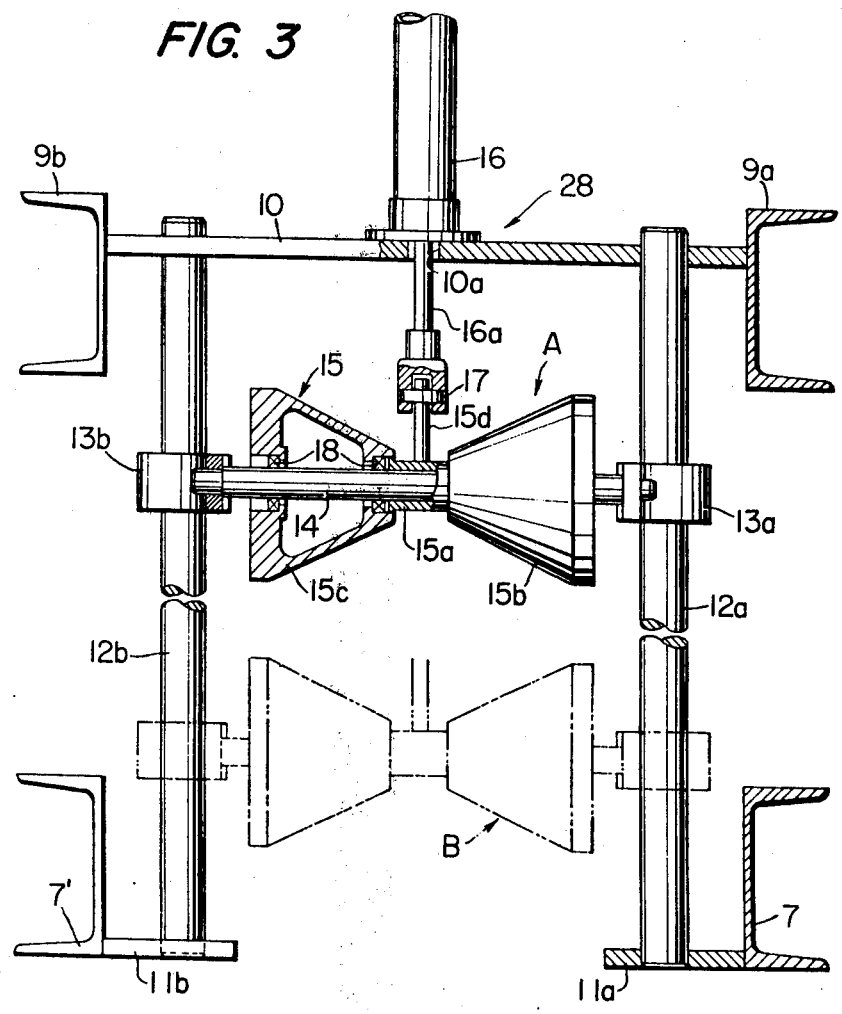
FIG. 3 is an enlarged fragmentary elevational view, partly in section, taken along the lines a—a in FIG. 1.

To the upper terminal ends of the fore columns 3a and 3b are respectively attached upper brackets 9a and 9b which respectively extend horizontally and inwardly from the upper terminal ends of the fore columns 3a and 3b and which are adapted to support thereon a cylinder supporting plate 10 as particularly shown in FIG. 3. The opposing and spaced intermediate side beams 7 and 7' have respective inner surfaces to which are respectively attached horizontal brackets 11a and 11b in parallel relation with the base plate structure 2 and in vertical alignment with the cylinder supporting plate 10. A pair of vertical guide rods 12a and 12b are secured at their upper ends to the cylinder supporting plate 10 and at their lower ends to the horizontal brackets 11a and 11b, respectively, in opposing and spaced apart relation with each other. On the vertical guide rods 12a and 12b are respectively slidably received movable brackets 13a and 13b which are designed to securely support both ends of a horizontal roller shaft 14 in parallel with the base plate structure 2. A pressing roller 15 comprises a cylindrical bracket 15a at the central portion thereof and a pair of truncated cone shaped drums 15b and 15c symmetrically disposed at the both ends of the cylindrical bracket 15a so as to be contoured in the form of a substantially hand-drum as a whole. The cylindrical bracket 15a of the pressing roller 15 is securely mounted on the central portion of the roller shaft 14 and has a projection 15d upwardly extending therefrom. The truncated cone shaped drum 15c of the pressing roller 15 is rotatably support on one side portion of the roller shaft 14 by means of spaced bearings 18, while the truncated cone shaped drum 15b of the pressing roller 15 is also rotatably supported on the other side portion of the roller shaft 14 by means of spaced bearings which is however not shown in the drawings. A pressing roller air cylinder 16 is vertically and securely mounted on the cylinder supporting plate 10 and has a piston rod 16a extending through a bore 10a formed in the cylinder supporting plate 10 in alignment with the upwardly extending projection 15d on the cylindrical bracket 15a of the pressing roller 15. The piston rod 16a of the air cylinder 16 is pivotally connected at its leading end to the upwardly extending projection 15d just mentioned above through a pivotal pin 17. When the pressing roller air cylinder 16 is thus actuated to cause the piston rod 16a to be projected and retracted, the pressing roller 15 is vertically moved from an initial operating position A shown in solid lines to a final operating position B shown in phantom lines and vice versa in FIGS. 1 and 3.

The combination of the pressing roller 15, the brackets 9a, 9b, 11a and 11b, the cylinder supporting plate 10, the guide rods 12a and 12b, the brackets 13a and 13b and the pressing roller air cylinder 16 constitutes as a whole a pressing roller operating arrangement, generally indicated at 28, which is adapted to move the pressing roller 15 toward and away from the outer peripheral wall of the tire T transferred into the tire finishing apparatus of the present invention. While there has been described the pressing roller operating arrangement 28, an additional pressing roller operating arrangement generally designated at 28' is provided symmetrically to the pressing roller operating arrangement 28 with respect to the second equatorial plane 8' of the stationary frame structure 1. The elements or parts of the additional pressing roller operating arrangement 28' are substantially identical in construction to those of the pressing roller operating arrangement 28 so that the similar constitutional elements of the additional pressing roller operating arrangement 28' are indicated by the primed reference numerals. An additional pressing roller 15' is likewise vertically moved by the action of an additional pressing roller air cylinder 16' from an initial operating position A shown in solid lines to a final operating position B shown in phantom lines and vice versa in FIG. 1. It is thus to be noted that the movement of the additional pressing roller 15' are substantially the same as that of the pressing roller 15 and the former similarly effects substantially the same function as that of the latter against the tire T to be finished. The further detailed constitutional description will thus not be made about the additional pressing roller 15' and the additional pressing roller operating arrangement 28' for the purpose of a tedious repetition.

As shown particularly in FIGS. 1, 2, 4 and 5, a pair of horizontal lower brackets 19a and 19b are attached to the longitudinally lower portions of the fore columns 3a and 3b, respectively, in opposing and spaced apart relation with each other and extend toward the second equatorial plane 8', terminating at a position spaced from the second equatorial plane 8'. On the longitudinally intermediate portions of the horizontal lower brackets 19a and 19b are respectively mounted bearings 20a and 20b which rotatably support both ends of a roller shaft 22 in parallel with the second equatorial plane 8' and the base plate structure 2. A receiving roller 21 is securely mounted on the longitudinally central portion of the roller shaft 22 by a suitable fastening means such as a key (not shown) and has an annular groove 21a formed in the axially central portion thereof. The roller shaft 22 has an axial end portion 22a extending outwardly of the bearing 20a and carrying a V-shaped grooved pulley 23 thereon. On the base plate structure 2 is mounted a motor stand 24 on which is mounted a roller rotating electric motor 25 having an output shaft 25a carrying a V-shaped grooved pulley 26 as shown particularly in FIGS. 1 and 2. Two endless belts 27 of V-shaped in cross section are stretched over the belt pulleys 23 and 26 so that the rotational torque of the electric motor 25 is transmitted to the receiving roller 21 by way of the output shaft 25a, the belt pulley 26, the endless belts 27, the belt pulley 23 and the roller shaft 22 to rotate the receiving roller 21. The combination of the V-shaped grooved pulleys 23 and 26, the electric motor 25 and the endless belts 27 constitutes as a whole a tire rotating mechanism which is generally designated at 29 in FIGS. 1 and 2. Similarly, a pair of additional horizontal lower brackets 19a' and 19b' the latter of which is not seen in the drawings but disposed opposingly to the former are attached to the longitudinally lower portions of the rear columns 4a and 4b, respectively, and extend toward the horizontal lower brackets 19a and 19b in symmetrical relation with the horizontal lower brackets 19a and 19b relative to the second equatorial plane 8' of the stationary frame structure 1. On the longitudinally intermediate portions of the additional horizontal lower brackets 19a' and 19b' are respectively mounted additional bearings 20a' and 20b' the latter of which is not seen in the drawings but disposed opposingly to the former and which rotatably support both ends of an additional roller shaft 22' in parallel relation to the roller shaft 22 and the base structure 2. An additional receiving roller 21' is securely mounted on the longitudinally central portion of the additional roller shaft 22'. The receiving rollers 21 and 21' are identically formed in a substantially cylindrical shape, however, the additional receiving roller 21' is free to rotate in contact with the outer wall of the tire T to be finished since the additional receiving roller 21' is not drivably connected to the tire rotating mechanism 29.

Figure 4:
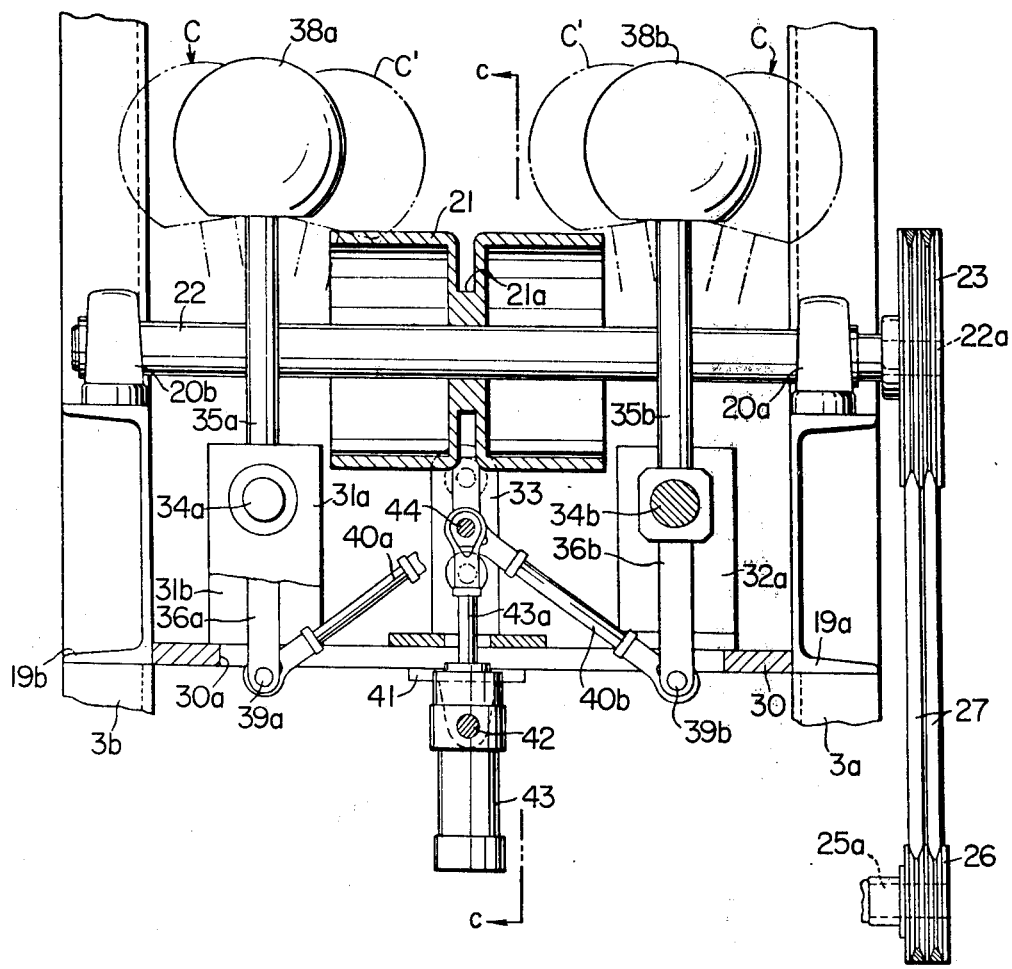
FIG. 4 is an enlarged fragmentary elevational view, partly in section, taken along the lines b—b in FIG. 1.
Figure 5:
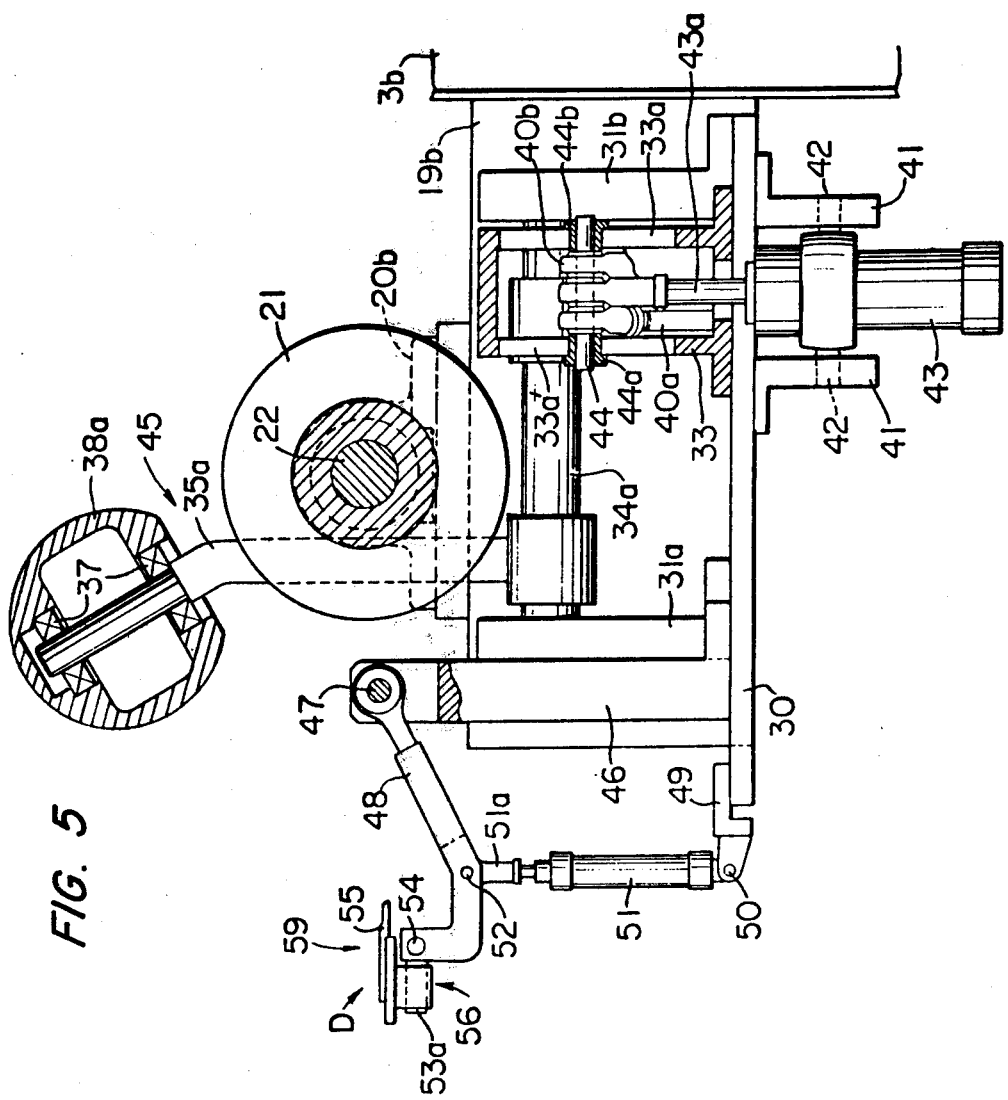
FIG. 5 is an elevational view, partly in section, taken along the line c—c in FIG. 4.

As shown particularly in FIGS. 4 and 5, a cylinder supporting plate 30 is attached at its both ends to the inner surfaces of the lower brackets 19a and 19b in parallel relation with the second equatorial plane 8' and the base structure 2 and has formed therein a longitudinal slot 30a extending at right angles with respect to the lower brackets 19a and 19b. On the cylinder supporting plate 30 in the vicinity of the bracket 19b are mounted a pair of parallel spaced brackets 31a and 31b while a pair of parallel spaced brackets 32a and 32b are also mounted on the cylinder supporting plate 30 adjacent the bracket 19a. The bracket 32b is not seen in the drawings but disposed opposingly to the bracket 32a and in alignment with the bracket 31b. Between and inwardly of the brackets 31b and 32b on the cylinder supporting plate 30 is mounted a bracket housing 33 which has vertical slots 33a and 33a' at its side walls in opposing relation with each other. The brackets 31a and 31b rockably support both ends of a rockable shaft 34a which is adapted to carry a centering roller supporting arm 35a in the vicinity of the bracket 31a and a rockable arm 36a adjacent the bracket 31b. On the other hand, the brackets 32a and 32b rockably support both ends of another rockable shaft 34b which is adapted to carry another centering roller supporting arm 35b in the vicinity of the bracket 32a and another rockable arm 36b adjacent the bracket 32b. The lower end portions of the rockable arms 36a and 36b extend through the longitudinal slot 30a of the cylinder supporting plate 30. Each of the centering roller supporting arms 35a and 35b has an upper portion curved toward the rotational axis of the tire T to be finished. On the upper curved portion of the centering roller supporting arm 35a is rotatably mounted through spaced bearings 37 a centering roller 38a which serves to contact with one of the side walls of the tire T with its rotational axis substantially parallel with a radial direction of the tire T. The centering roller 38a is formed in a substantially spherical shape having a truncated lower portion. The lower terminal end of the rockable arm 36a is pivotally connected by a pivotal pin 39a to one end of a connecting rod 40a which has the other end pivotally connected by a pivotal pin 44 to a piston rod 43a of a centering roller air cylinder 43. On the upper curved portion of the centering roller supporting arm 35b is likewise rotatably mounted through spaced bearings (not shown) another centering roller 38b which serves to contact with the other side wall of the tire T with its rotational axis substantially parallel with a radial direction of the tire T. The centering roller 38b is also formed in a substantially spherical shape having a truncated lower portion. Also, the lower terminal end of the rockable arm 36b is pivotally connected by a pivotal pin 39b to one end of a connecting rod 40b which is in position symmetrical to the connecting rod 40a with respect to the piston rod 43a of the centering roller air cylinder 43 and which has the outer end pivotally connected by the pivotal pin 44 to the piston rod 43a of the centering roller air cylinder 43. The pivotal pin 44 has both ends which securely receive respective guide members 44a and 44b which are in turn in slidable engagement with the vertical slots 33a and 33a', respectively, of the bracket housing 33. To the lower surface of the cylinder supporting plate 30 is attached parallel spaced plate brackets 41 which pivotally support the centering roller air cylinder 43 through pivotal pins 42. When the centering roller air cylinder 43 is thus actuated to cause the piston rod 43a to be projected and retracted, the opposing and spaced centering rollers 38a and 38b are swung from their initial operating position C to their final operating position C' and vice versa as shown in phantom lines of FIG. 4 through the pivotal pin 44, the connecting rods 40a and 40b, the rockable arms 36a and 36b, the rockable shafts 34a and 34b, and the centering roller supporting arms 35a and 35b. When the centering rollers 38a and 38b assume their positions C', the tire T is held at its side walls by the centering rollers 38a and 38b so that the equatorial plane of the tire T is brought into alignment with the first equatorial plane 8 of the stationary structure 1 and thus is prevented from being vibrated during rotation thereof. The combination of the centering rollers 38a and 38b, the centering roller supporting arms 35a and 35b, the rockable shafts 34a and 34b, the connecting rods 40a and 40b, and the centering roller air cylinder 43 constitutes as a whole a centering roller operating arrangement generally designated at 45 for supporting and moving the centering rollers 38a and 38b toward and away from each other to assume their initial operating position C and their final operating position C'.

While there has been described a centering roller operating arrangement 45 for supporting and moving the centering rollers 38a and 38b toward and away from each other, an additional centering roller operating arrangement generally designated at 45' is located symmetrically to the centering roller operating arrangement 45 with respect to the second equatorial plane 8' of the stationary frame structure 1 to support and move additional centering rollers 38a' and 38b' toward and away from each other. The additional centering roller 38b' of the additional centering roller operating arrangement 45' is, however, not seen in the drawings but disposed opposing to the additional centering roller 38a' in alignment with the centering roller 38b of the centering roller operating arrangement 45. The additional centering roller operating arrangement 45' is substantially the same in construction as the centering roller operating arrangement 45 so that the reference numerals of the constitutional elements or parts of the additional centering roller operating arrangement 45' are primed with those of the centering roller operating arrangement 45. The detailed constitutional description will thus not be made hereinafter concerning the construction of the additional centering roller operating arrangement 45'.

As shown particularly in FIGS. 5 to 8, a vertical bracket 46 is securely mounted on the cylinder supporting plate 30 and has an upper terminal end pivotally supporting one end of a first tread spew trimming cutter supporting arm 48 by means of a pivotal pin 47 so that the supporting arm 48 is rockable about the pivotal pin 47. On the forward end of the cylinder supporting plate 30 immediately below and in vertical alignment with the first tread spew trimming cutter supporting arm 48 is securely mounted a bracket 49 which is adapted to pivotally support by means of a pivotal pin 50 the lower end of a first tread spew trimming cutter air cylinder 51 whose piston rod 51a is pivotally connected to the longitudinally intermediate portion of the first tread spew trimming cutter supporting arm 48. The other end portion of the trimming cutter supporting arm 48 is curved upwardly and has a groove 48a within which a first trimming cutter holder supporting bracket 53 is interposed and pivotally supported by the supporting arm 48 through a pivotal pin 54 so as to be rockable about the pivotal pin 54. The first cutter holder supporting bracket 53 has a pin portion 53a extending oppositely to the first tread spew trimming cutter supporting arm 48 and rotatably supporting a lower projection 56a formed on the underside of a first trimming cutter holder generally designated at 56. The cutter holder 56 is formed with a dove-tail groove 56b which engages a first tread spew trimming cutter 55 in the form of a substantially comb so that the cutter 55 is securely retained by the cutter holder 56 even upon spew trimming operation thereof.

As shown in FIGS. 9, 10 and 11, the first tread spew trimming cutter 55 comprises a holding portion 55a to be retained by the cutter holder 56 and a cutting portion 55b integrally formed with the holding portion 55a. The cutting portion 55b is formed with a number of parallel spaced grooves 55c each of which has a bottom triangularly cross-sectioned and each of which is slanted toward the forward end of the trimming cutter 55 so as to make a pair of opposing spew trimming blades 55d in a substantially triangular form converging the holding portion 55a. A number of sharp point edges 55e are thus formed in side-by-side relation at the converged intersection of the spew trimming blades 55d in the cutting portion 55b of the trimming cutter 55. A stepped portion 55f is formed on the reverse side of the spew trimming cutter 55 rearwardly of the sharp point edges 55e so as to produce a small gap between the sharp point edges 55e and the tread surface S of the tire T when the trimming cutter 55 is brought into contact with the tread surface S of the tire T. According to out repeated experiments, it is most preferable that the distance X from the sharp point edges 55e to the stepped portion 55f ranges from 3.0mm to 5.0mm and the height Y from the sharp point edges 55e to the reverse side of the trimming cutter 55 ranges 0.1mm to 0.5mm. The tread spews P were difficult to be trimmed below the distance X of 3.0mm, while the stability of the trimming cutter 55 was made worse over the distance of 5.0mm, giving difficulties to a predetermined positioning of the sharp point edges 55e to the tread surface S of the tire T. On the other hand, the tread surface S was damaged by the sharp point edges 55e below the height of 0.1mm, and the tread spews P were not satisfactorily cut over the height of 0.5mm. When the tread spew trimming cutter air cylinder 51 is thus actuated to cause the piston rod 51a to be projected and retracted, the spew trimming cutter supporting arm 48 is swung upwardly and downwardly about the pivotal pin 47 so that the tread spew trimming cutter 55 is moved from an initial operating position D shown in FIG. 5 to a final operating position, where the tread spew trimming cutter 55 contacts with the tread surface of the tire T to trim and remove the spews projected from the tread surface of the tire T, and vice versa.

The combination of the first tread spew trimming cutter 55, the supporting arm 48, the first tread spew trimming cutter air cylinder 51, and the first trimming cutter holder 56 constitutes as a whole a first trimming cutter arrangement which is generally designated at 59 in FIG. 5.

As shown particularly in FIGS. 12 to 16, two parallel spaced side brackets 62 (see FIG. 2) are each connected to both ends to the fore columns 3c and 4c in parallel relation with the first equatorial plane 8 and the base plate structure 2 and have inner walls securely attached to a bracket 63 which in turn fixedly supports at its inner wall a back plate 65 forming a part of a housing 64 in perpendicular relation to the stationary structure 2. The housing 64 comprises the back plate 65, upper and lower plates 66 and 67 securely connected to the upper and lower surfaces of the back plate 65 in parallel with the base plate structure 2, and side plates 68a and 68b securely connected to the side surfaces of the back plate 65 in perpendicular relation with the base plate structure 2 so that the housing 64 is opened toward the first equatorial plane 8. On the underside of the central portion of the upper plate 66 and on the upperside of the central portion of the lower plate 67 are mounted a pair of bearings 69 and 69' which rotatably support both ends of a vertical screw shaft 70 having a threaded portion 70a. The screw shaft 70 has an upper axial portion extending beyond the upper plate 66 and drivably connected with a brake 71 mounted on the upper plate 66 and has an lower axial portion 70b extending throughout a bore 67a formed in the lower plate 67 and fixedly carrying a V-shaped belt pulley 72. The lower plate 67 has a horizontally extending portion 67b on which an electric motor 73 is mounted having an output shaft 73a. A V-shaped belt pulley 74 is securely carried by the output shaft 73a of the electric motor 73 and drivably connected to the belt pulley 72 by means of an endless belt 75. The threaded portion 70a of the screw shaft 70 is engaged with a threaded portion 76a formed in a carriage 76. The carriage 76 is slidably received and guided by a pair of vertical guide rods 77a and 77b which are disposed in symmetrical and parallel relation to the screw shaft 70 and have upper ends securely held by the upper plate 66 and the lower ends securely held by the lower plate 67. The carriage 76 is formed with vertical parallel spaced bores 76b each of which retains bearings 78 and 79 slidably engaged with each of the guide rods 77a and 77b. A movable frame structure generally designated at 80 comprises a back plate 81 attached to the fore surface of the carriage 76, an upper plate 82 securely fixed to the fore surface of the back plate 81 in parallel with the base plate structure 2, a pair of side plates 83a and 83b secured to both sides of the upper plate 82 in perpendicular relation with the upper plate 82, and a fore plate 84 fixed to the fore surfaces of the upper and side plates 82, 83a and 83b in perpendicular relation with the upper plate 82 as shown particularly in FIGS. 14 and 15. A pair of spaced reinforcing plates 85a and 85b are provided to fixedly connect the back plate 81 and the side plates 83a, 83b for reinforcing attachment of the movable frame structure 80 to the back plate 81. On the longitudinally central portion of the upper plate 82 is securely mounted a bracket 86 which has an upper terminal end pivotally supporting a second tread spew trimming cutter air cylinder 88 by a pivotal pin 87. The air cylinder 88 has a piston rod 88a pivotally connected to a projection 91a formed on a longitudinally intermediate portion of a rockable arm 91 which has one end pivotally connected to a bracket 89 by a pivotal pin 90. The bracket 89 is secured to the side plate 83a of the movable frame structure 80 in neighbourhood of the bracket 86. On the other end of a rockable arm 91 is fixedly mounted a pin member 93 through a certain angle under an initial operating position F, which pin member 93 in turn rotatably supports a boss portion 95a of a second tread spew trimming cutter holder 95 holding a second tread spew trimming cutter 94. The first tread spew trimming cutter 55 serves mainly to trimmingly cut an annular fin formed on the axially center line of the tread surface while the second tread spew trimming cutter 94 serves mainly to trimmingly cut spews formed on the axially central portion of the tread surface adjacent the annular fin. The second tread spew trimming cutter 94 is substantially identical in construction to the first tread spew trimming cutter 55 so that the construction of the trimming cutter 94 will not be described hereinafter. In addition, the cutter holder 95 is also substantially the same in construction as the cutter holder 56 so that its construction will also not be discussed hereinlater. A pair of parallel spaced guide rods 96a and 96b are connected at their both ends to the fore plate 84 and the back plate 81 in parallel relation with upper plate 82 of the movable frame structure 80. On the guide rods 96a and 96b are slidably supported a pair of brackets 97a and 97b in symmetrical relation with respect to the second tread spew trimming cutter 94, which brackets 97a and 97b are formed at their opposite sides with brackets 98a and 98b, respectively. A pair of brackets 99a and 99b are attached to the underside of the upper plate 82 of the movable frame structure 80 in diagonal relation, viz., the former being in alignment with the bracket 98a along the guide rods 96a and 96b as shown particularly in FIG. 15. An air cylinder 100a has a piston rod 101a pivotally connected to the bracket 98a by a pivotal pin 102a and a bottom end 103a pivotally connected to the bracket 99a by a pivotal pin 104a. Similarly, an additional cylinder 100b has a piston rod 101b pivotally connected to the bracket 98b by a pivotal pin 102b and a bottom end 103b pivotally connected to the bracket 99b by a pivotal pin 104b. When the air cylinders 100a and 100b are thus concurrently actuated to cause the piston rods 101a and 101b to be projected and retracted, the brackets 97a and 97b are moved under guidance of the guide rods 96a and 96b toward and away from each other. On the brackets 97a and 97b are securely mounted symmetrically to the second tread spew trimming cutter 94 a pair of brackets 105a and 105b, respectively, which have upper terminal ends pivotally supporting air cylinders 107a and 107b, respectively, by pivotal pins 106a and 106b. The air cylinders 107a and 107b have respective piston rods 108a and 108b pivotally connected by pivotal pins 111a and 111b, respectively, to projections 110a and 110b, respectively, formed on longitudinally intermediate portions of rockable arms 109a and 109b, respectively. On the forward ends of the rockable arms 109a and 109b are formed lower projections 112a and 112b, respectively, carrying brackets 113a and 113b which in turn rotatably support third thread spew trimming cutter holders 115a and 115b, respectively, by pivotal pins 114a and 114b. The rear ends of the rockable arms 109a and 109b are rockably supported by the movable brackets 97a and 97b, respectively, through pivotal pins 60a and 60b so that the rockable arms 109a and 109b are respectively rockable about the pivotal pins 60a and 60b.

Figure 17:
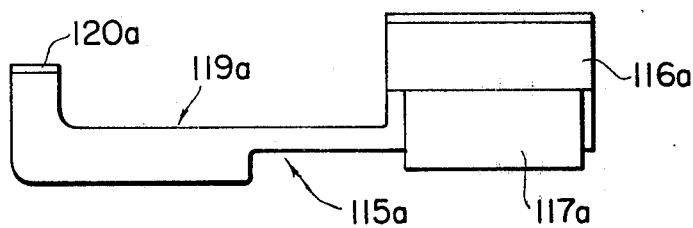
FIG. 17 is an enlarged side view of a third tread spew trimming cutter holder.
Figure 18:
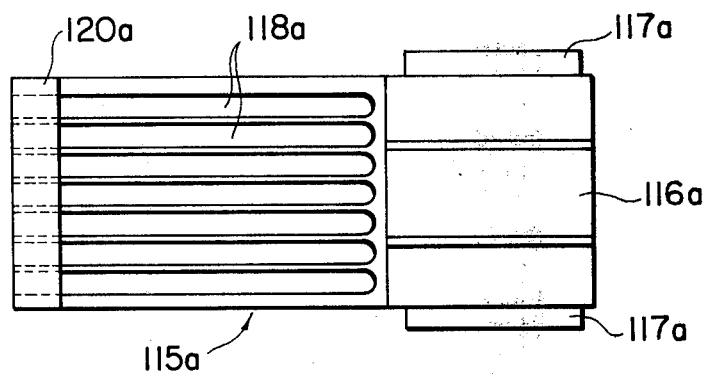
FIG. 18 is a plan view as seen from the upper position in FIG. 17.
Figure 19:
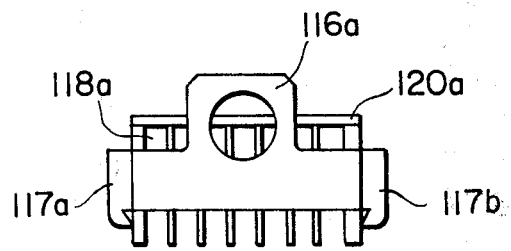
FIG. 19 is a rear view as seen from the right in FIG. 17.

As shown particularly in FIGS. 17 to 19, the trim-trimming cutter holder 115a comprises a boss portion 116a to be securely fitted with the bracket 113a by the pivotal pin 114a, a pair of retaining portions 117a formed at the both sides of the boss portion 116a and a comb portion 119a having a multitude of parallel spaced slits 118a formed at the forward portion of the trimming cutter holder 115a. The forward end of the trimming cutter holder 115a is curved upwardly and has a reinforcing plate 120a thereon for the purpose of maintaining the slits 118a at a constant width. The retaining portions 117a of the trimming cutter holder 115a are formed at their inner surfaces with dove-tail grooves 117b which are adapted to securely receive both sides of the third tread spew trimming cutter 121a. The cutter holder 115b is substantially identical in construction to the cutter holder 115a so that the detailed construction of the cutter holder 115b will not be made in the following description. Additionally, the third tread spew trimming cutters 121a and 121b are substantially the same in construction to the first tread spew trimming cutter 55 so that the construction of the third tread spew trimming cutters 121a and 121b will not be described hereinafter. The third trimming cutters 121a and 121b are thus moved toward and away from the tread surface of the tire T through the rockable arms 109a and 109b by the action of the air cylinders 107a and 107b, while being moved axially along the tread surface of the tire T with the movement of the brackets 97a and 97b toward and away from each other by the action of the air cylinders 100a and 100b. The comb portion 119a of the cutter holder 115a demonstrates an advantageous effect when the third tread spew trimming cutter 121a reaches a shoulder portion of the tire T. Namely, the spews projected at the shoulder portion are allowed to move between the slits 118a of the comb portion 119a of the cutter holder 115a and thereafter trimmingly cut by the third tread spew trimming cutter 121a. At this time, the tire surface is by no means deeply cut by the trimming cutter 121a since the underside of the comb portion 119a is maintained in contact with the tire surface. Even in the event that spews projected from acutely curved portions such as seen in a block pattern tire are trimmed, the tire surface is not damaged since the width of the slits 118a are made sufficiently narrow. On the inner surface of the side plate 83a of the movable frame structure 80 are securely mounted a pair of brackets 122a and 122b in symmetrical relation with respect to the second tread spew trimming cutter 94. The brackets 122a and 122b support vertical rods 124a and 124b, respectively, to which are movably attached photoelectric switches 123a and 123b for producing an electric signal to stop the electric motor 73 on the lower plate 67 of the housing 64 and to act the brake 71 on the upper plate 66 of the housing 64. The positions of the photoelectric switches 123a and 123b are adapted to be adjusted along the vertical rods 124a and 124b, respectively.

Figure 14:
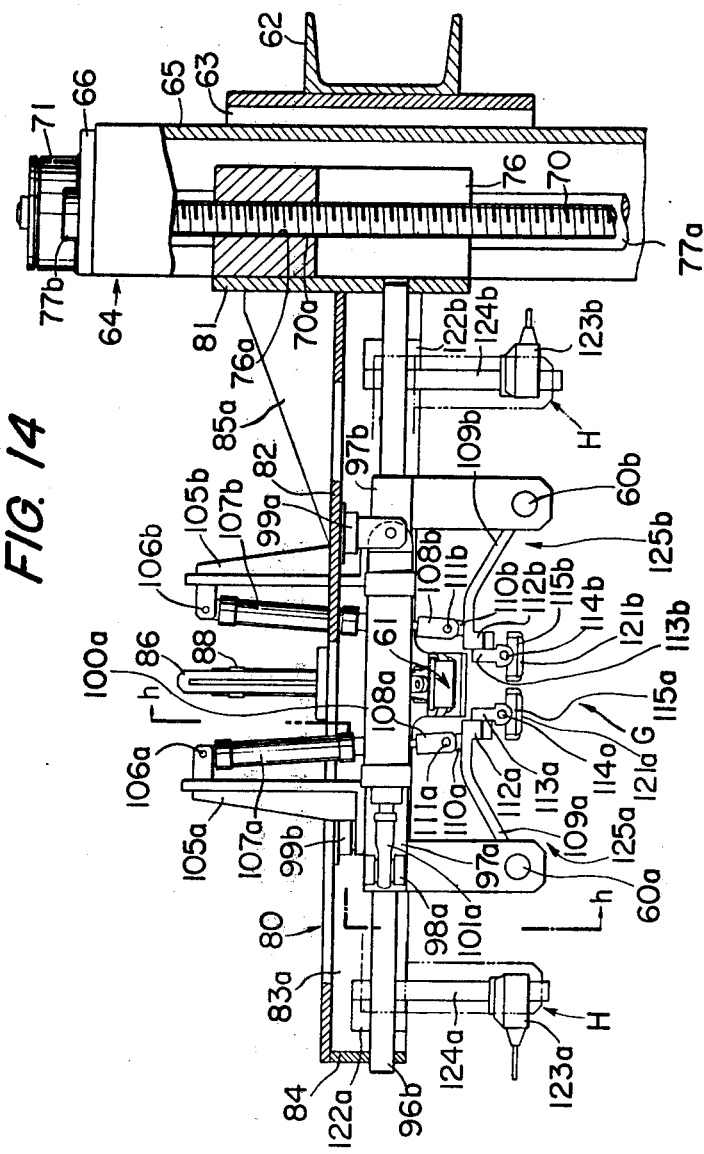
FIG. 14 is a fragmentary side elevational view, partly in section, as seen from the lines g—g in FIG. 12.
Figure 15:
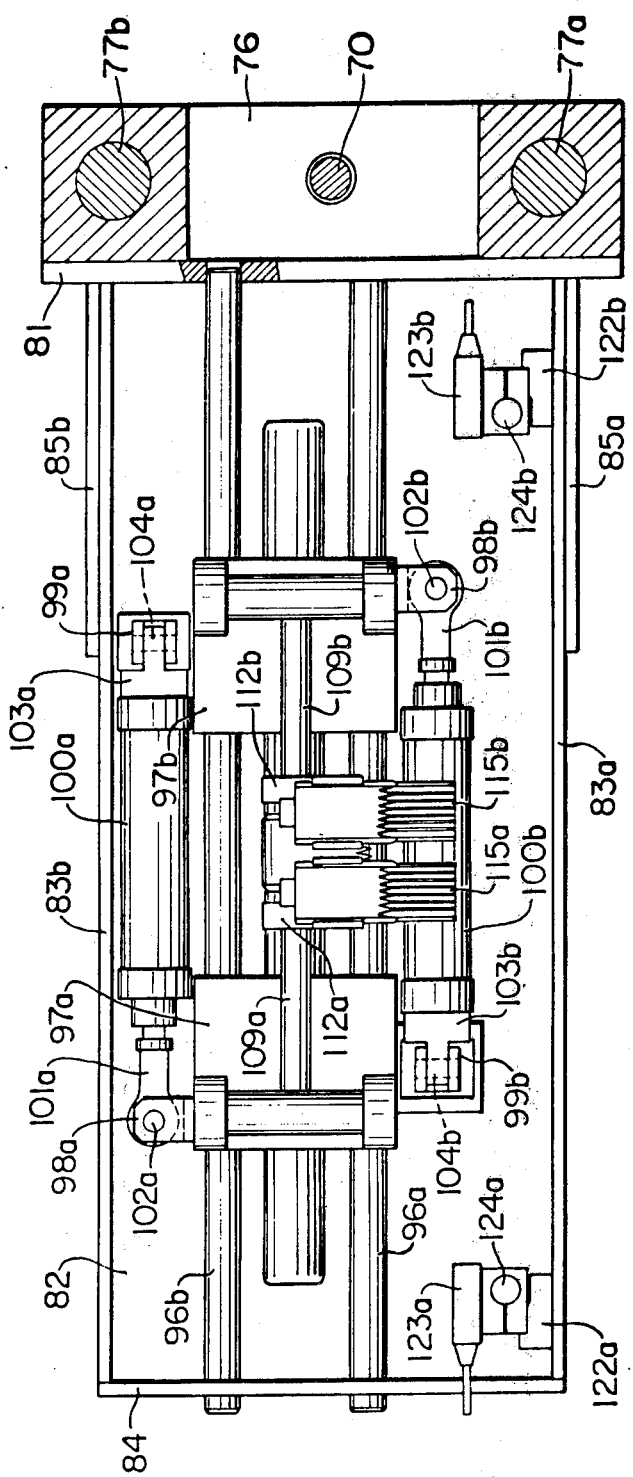
FIG. 15 is a bottom view, partly in section, as seen from the lower position in FIG. 14.
Figure 16:
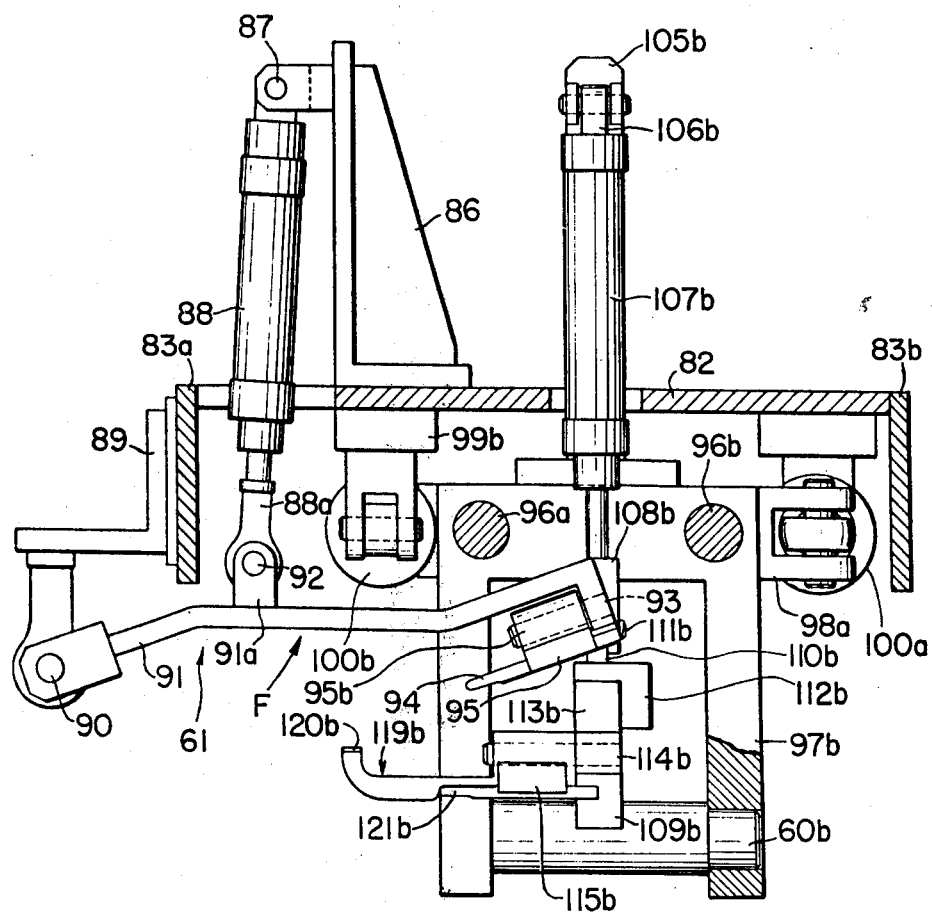
FIG. 16 is a fragmentary elevational view, partly in section, as seen from the lines h—h in FIG. 14.

The movable frame structure 80 is thus moved by the electric motor 73 through the V-shaped belt pulley 74, the V-shaped endless belt 75, the V-shaped belt pulley 72 and the screw shaft 70 from an initial operating position E to a final operating position, where the photoelectric switches 123a and 123b detect the tread surface of the tire T, and vice versa as shown in FIG. 12. The second tread spew trimming cutter 94 is thus moved by the action of the air cylinder 88 from an initial operating position F to a final operating position, where the trimming cutter 94 is brought into contact with the tread surface of the tire T, and vice versa as shown in FIG. 16. The third tread spew trimming cutters 121a and 121b are thus moved by the action of the air cylinders 107a and 107b, respectively, from initial operating positions G to final operating positions, where the third tread spew trimming cutters 121a and 121b come to be contact with the tread surface of the tire T, and vice versa as shown in FIG. 14. Further, the third tread spew trimming cutters 121a and 121b are thus moved by the action of the respective air cylinders 100a and 100b to the final operating positions H shown in phantom lines from the initial operating position shown in solid lines in FIG. 14 and vice versa. The air cylinders 107a, 107b, 100a and 100b are filled with an oil below a pressure 7kg/cm² so that oscillations or vibrations of the third tread spew trimming cutters 121a and 121b are decreased and horizontal movements of the third tread trimming cutters 121a and 121b are effected smoothly and at a constant speed. In view of these reasons, there is caused no damage on the tread surface of the tire and left no spew thereon. The oil to be filled in the air cylinders 107a, 107b, 100a and 100b may be replaced by any other suitable uncompressible liquid.

The combination of the rockable arm 91, the air cylinder 88, the tread spew trimming cutter holder 95 and the second tread spew trimming cutter 94 constitutes as a whole a second trimming cutter arrangement which is generally designated at 61 in FIGS. 14 and 16. Furthermore, the combination of the rockable arm 109a, the air cylinder 107a, the trimming cutter holder 115a and the third tread spew trimming cutter 121a constitutes as a whole a third tread spew trimming cutter arrangement which is generally indicated at 125a in FIG. 14. Similarly, the combination of the rockable arm 109b, the air cylinder 107b, the trimming cutter holder 115b and the third tread spew trimming cutter 121b constitutes as a whole an additional third tread spew trimming cutter arrangement which is generally indicated at 125b in FIG. 14.

Figure 20:
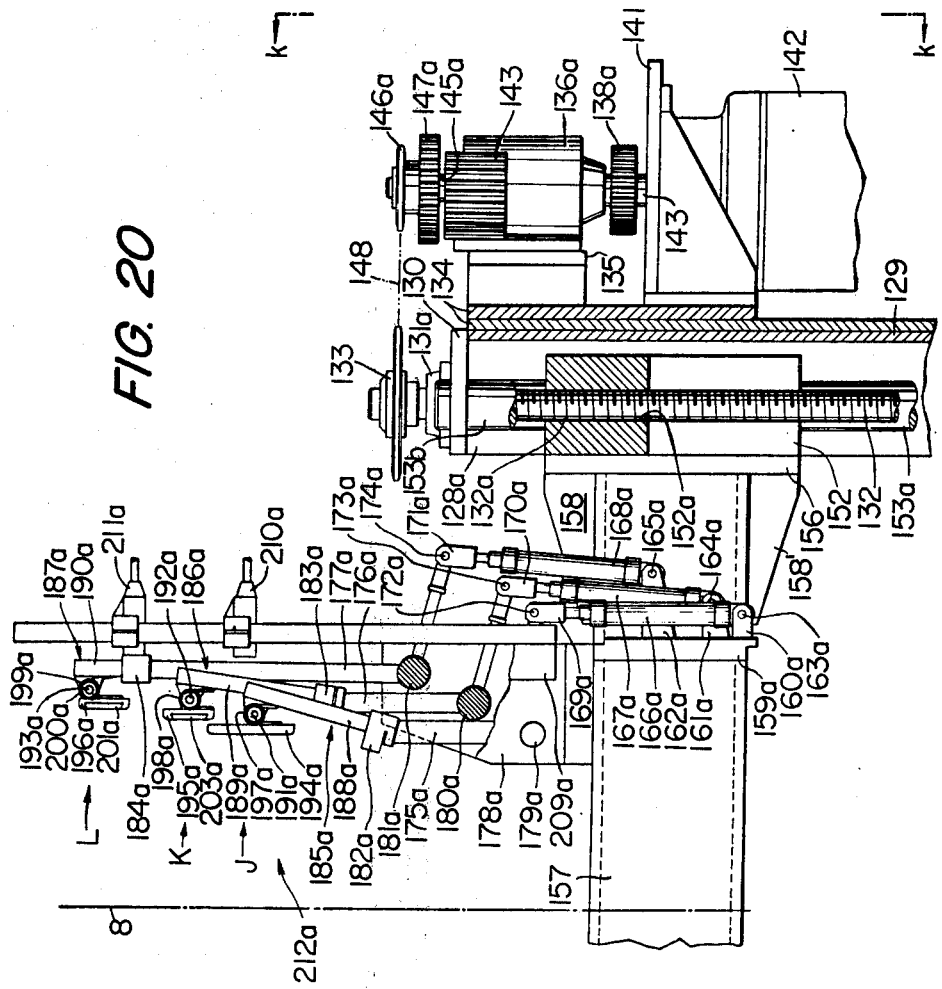
FIG. 20 is an enlarged fragmentary elevational view, partly in section, as seen from the lines i—i in FIG. 1 but showing only one of side tread spew trimming cutter arrangements.
Figure 21:
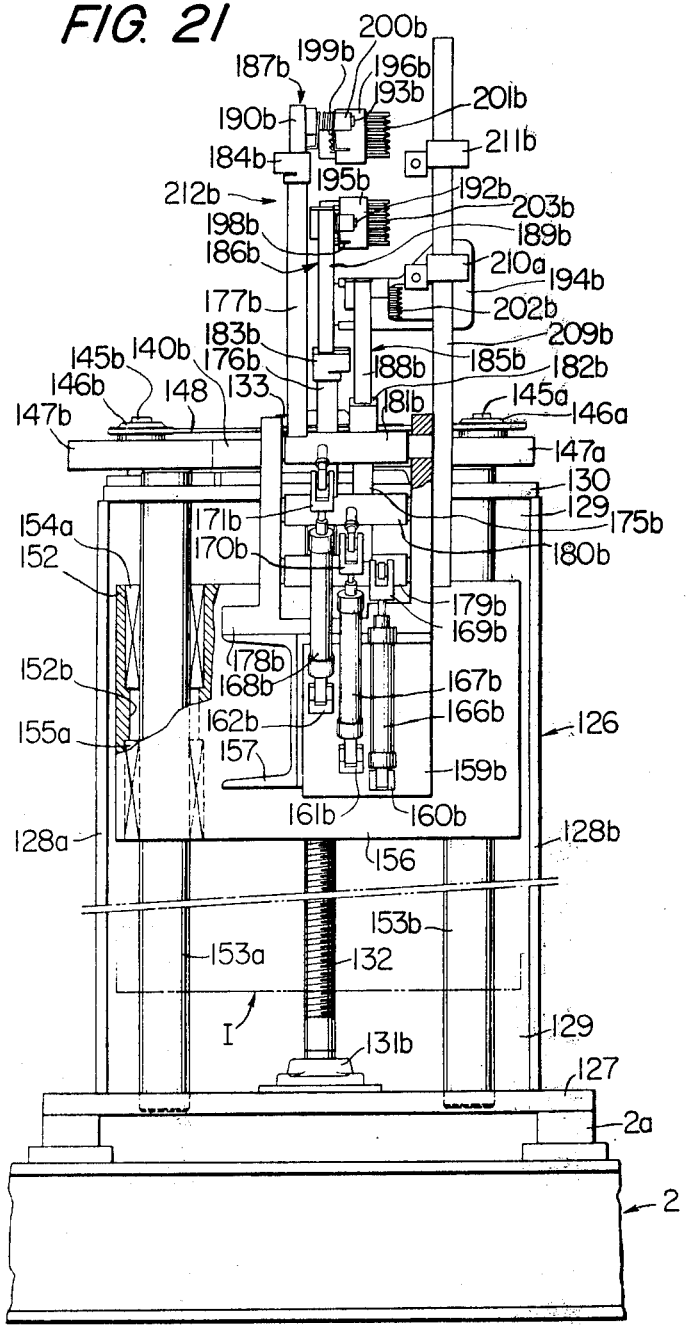
FIG. 21 is an enlarged fragmentary elevational view, partly in section, as seen from the lines j—j in FIG. 2.
Figure 22:
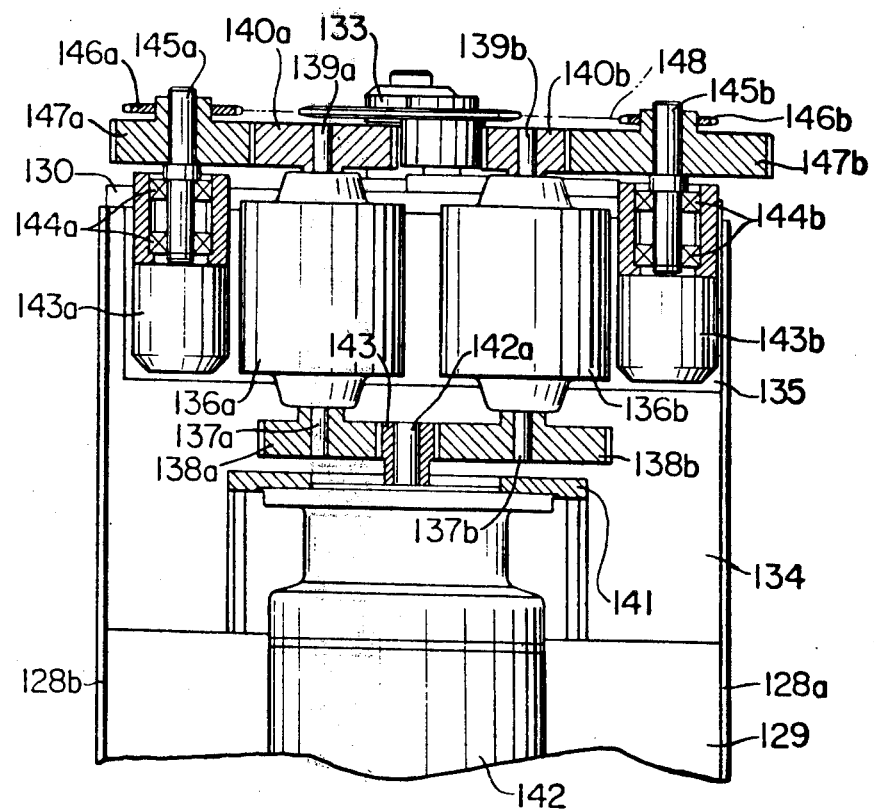
FIG. 22 is an fragmentary elevational view, partly in section, as seen from the lines k—k in FIG. 20.
Figure 23:
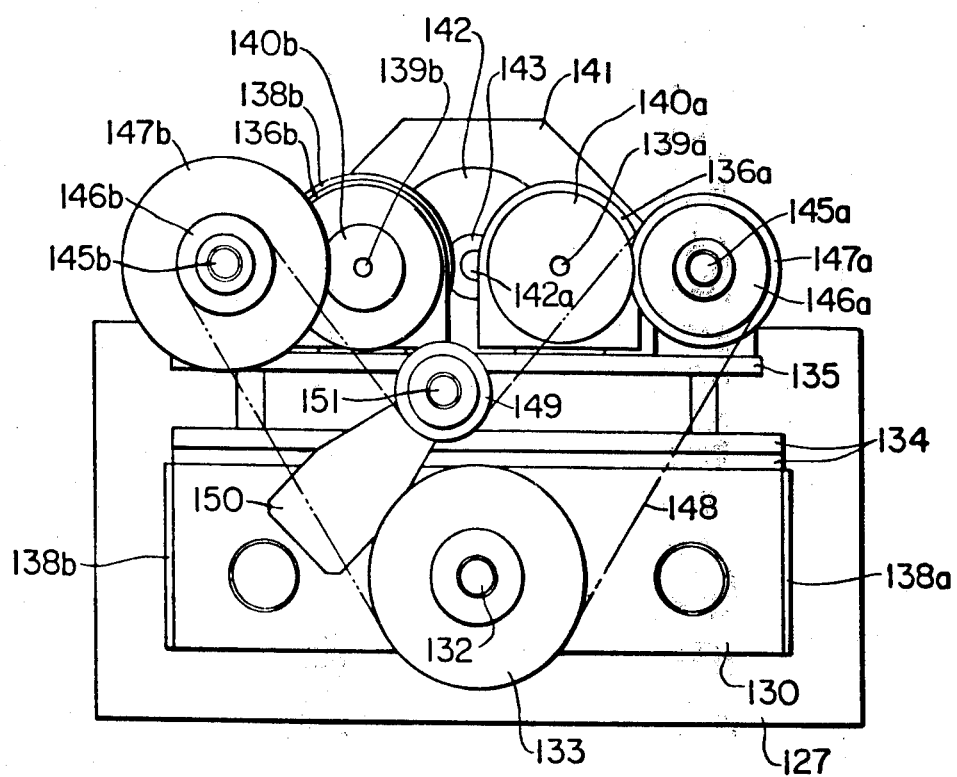
FIG. 23 is a plan view as seen from the upper position in FIG. 22.

Referring back to FIGS. 1 and 2, on the rear portion of the base plate structure 2 between the fore column 3c and the rear column 4c is mounted a stand 2a on which is provided a housing generally indicated at 126. The housing 126 comprises a lower plate 127 horizontally attached onto the stands 2a, a pair of side plates 128a and 128b vertically and fixedly mounted on the both sides of the lower plate 127, a back plate 129 attached to the rear sides of the lower plate 127 and the side plates 128a and 128b, and an upper plate 130 securely mounted on the upper ends of the side plates 128a and 128b and the back plate 129 in parallel with the base plate structure 2 so that the housing 126 is opened toward the first equatorial plane 8. On the central portions of the upper and lower plates 130 and 127 are respectively mounted bearings 131a and 131b, the former of which is illustrated in FIG. 20. The bearings 131a and 131b are adapted to rotatably support upper and lower end portions of a screw shaft 132 which has an upper axial portion extending beyond the bearing 131a and securely connected with a sprocket wheel 133 as shown in particularly in FIG. 20. On the rear surface of the back plate 129 of the housing 126 is attached a bracket supporting plates 134 which have upper portions securely supporting a bracket 135. As shown particularly in FIGS. 20, 22 and 23, a pair of clutches 136a and 136b are securely mounted on the rear surface of the bracket 135 in side-by-side relation with each other. The clutch 136a has an input shaft 137a carrying a spur gear 138a and an output shaft 139a carrying a spur gear 140a, while the additional clutch 136b also has an input shaft 137b carrying a spur gear 138b and an output shaft 139b carrying a spur gear 140b in a similar manner. On the bracket supporting plate 134 below the bracket 135 is securely mounted a horizontal bracket 141 which is adapted to support an electric motor 142 having an output shaft 142a which carries a spur gear 143 which is in mesh with the spur gears 138a and 138b. A pair of brackets 143a and 143b are securely mounted on the rear side of the bracket 135 outwardly of the clutches 136a and 136b and have bearings 144a and 144b, respectively. A pair of vertical rotary shafts 145a and 145b are rotatably supported by the brackets 143a and 143b, respectively, through the respective bearings 144a and 144b and have upper portions which respectively carry spur gears 147a and 147b fixedly supporting sprocket wheels 146a and 146b, respectively. The spur gear 147a is in meshing engagement with the spur gear 140a, and the spur gear 147b is in meshing engagement with the gear 140b. An endless chain 148 is stretched over the sprocket wheels 133, 146a and 146b. In order to give a predetermined tension to the endless chain 148, a tension sprocket wheel 149 is provided between the sprocket wheels 146a and 146b. A plate 150 is adjustably mounted on the upper plate 130 of the housing 126 and provided at its forward end with a vertical fixed shaft 151 rotatably carrying the tension sprocket wheel 149. The screw shaft 132 has a threaded portion 132a which is in engagement with a threaded portion 152a formed in a carriage 152 as shown in FIG. 20. The carriage 152 is slidably received and guided by a pair of guide rods 153a and 153b which are disposed in symmetrical and parallel relation to the screw shaft 132 and which have upper ends securely retained by the upper plate 130 of the housing 126 and lower ends securely retained by the lower plate 127 of the housing 126. The carriage 152 is formed with bores 152b only one of which is shown in FIG. 21 and each of which retains bearings 154a and 155a slidably engaged with each of the guide rods 153a and 153b. The carriage 152 is thus moved upwardly and downwardly by the electric motor 142 through the spur gear 143, the spur gears 138a and 138b, the clutches 136a and 136b, the spur gears 140a and 140b, the spur gears 147a and 147b, the sprocket wheels 146a and 146b, the endless chain 148, the sprocket wheel 133 and the screw shaft 132.

On the fore surface of the carriage 152 is securely mounted a front plate 156 which fixedly supports a movable side wall spew trimming cutter supporting arm 157 extending in parallel relation with the base plate structure 2 and across the first equatorial plane 8. A pair of reinforcing plates 158 and 158' are provided to securely connect the upper and lower portions of the supporting arm 157 with the front plate 156.

To the side wall of the supporting arm 157 are attached a pair of parallel spaced air cylinder supporting plates 159a and 159b (see FIG. 21) in perpendicular relation to the supporting arm 157. On the outer side of the air cylinder supporting plate 159a are securely mounted in stepped fashion first, second and third brackets 160a, 161a and 162a which are adapted to pivotally support first, second and third air cylinders 166a, 167a and 168a, respectively, by pivotal pins 163a, 164a and 165a. The first, second and third air cylinder 166a, 167a and 168a have respective piston rods 169a, 170a and 171a which are pivotally connected to lower ends of first, second and third rockable arms 175a, 176a and 177a, respectively, by pivotal pins 172a, 173a and 174a. A pair of parallel spaced brackets 178a are mounted on the supporting arm 157 and the supporting plate 159a in opposing relation to each other and rotatably and steppedly support rotary shafts 179a, 180a and 181a in parallel relation with the base plate structure 2 and the first equatorial plane 8. On the upper ends of the first, second and third rockable arms 175a, 176a and 177a are securely mounted boss members 182a, 183a and 184a, respectively, which receive and support cylindrical portions 188a, 189a and 190a of first, second and third cutter holder supporting brackets generally designated at 185a, 186a and 187a so as to be adjustable around their respective rotational axes. On the upper ends of the cylindrical portions 188a, 189a and 190a of the first, second and third cutter holder supporting brackets 185a, 186a and 187a are fixedly mounted in opposing and parallel relation with the first equatorial plane 8 horizontal pin members 191a, 192a and 193a which are adapted to rotatably support first, second and third side wall spew trimming cutter holders 194a, 195a and 196a. Around the pin members 191a, 192a and 193a are surrounded resilient coil springs 197a, 198a and 199a, respectively, which have respective one ends engaged with the first, second and third side wall spew trimming cutter holders 194a, 195a and 196a and the respective other ends engaged with the cylindrical portions of the first, second and third cutter holder brackets 185a, 186a and 187a. The resilient coil springs 197a, 198a and 199a serves to force the first, second and third trimming cutter holders 194a, 195a and 196a to their stable positions at all times when the first, second and third trimming cutter holders 194a, 195a and 196a are caused to rotate around pin members 191a, 192a and 193a by external forces. First, second and third side wall spew trimming cutters 202a, 203a and 201a which are retained by the first, second and third side wall spew trimming cutter holders 194a, 195a and 196a are substantially the same in construction as the first tread spew trimming cutter 55 so that their detailed description will not be made in the following discussion. The first side wall spew trimming cutter 202a is, however, not illustrated in the drawing but disposed in symmetrical relation to an additional first side wall spew trimming cutter 202b (see FIG. 21) with respect to the first equatorial plane 8. The third trimming cutter holder 196a has at its rear face a boss portion 200a whose axis is remote upwardly from the horizontal center line of the third trimming cutter holder 196a, so that the third side wall spew trimming cutter 201a is preferably moved along inwardly curved side wall surface in the vicinity of a bead portion so as to satisfactorily trim spews projected on the inwardly curved side wall surface. The second and third side wall spew trimming cutter holders 195a and 196a are substantially identical in construction to the first tread spew trimming cutter holder 56 with the exception that the third side wall spew trimming cutter holder 196a has a rotational axis positioned above the horizontal center line of the third trimming cutter holder 196a. The construction of the second and third side wall spew trimming cutter holders 195a and 196a will, therefore, not be described in detail hereinlater.

Figure 24:
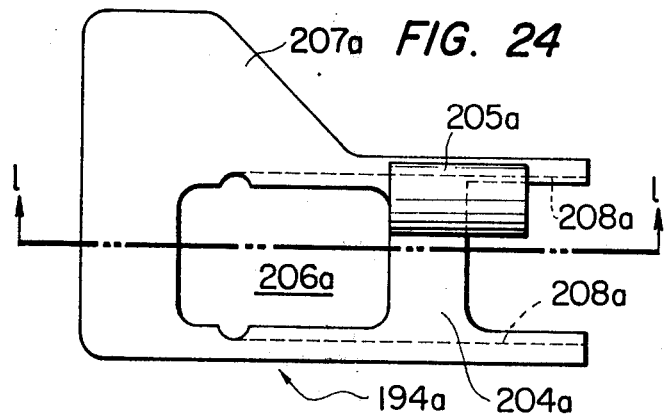
FIG. 24 is an enlarged plan view of a first side wall spew trimming cutter holder for holding a first side wall spew trimming cutter.
Figure 25:
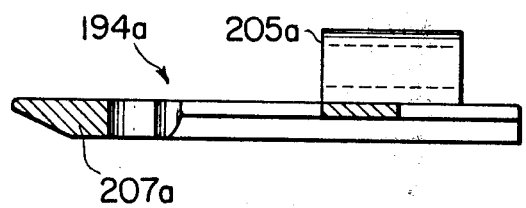
FIG. 25 is a cross-sectional view taken along the lines l—l in FIG. 24.
Figure 26:
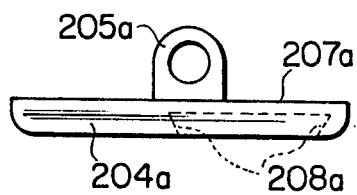
FIG. 26 is a rear view as seen from the right in FIG. 25.

As shown in FIGS. 24, 25 and 26, the first side wall spew trimming cutter holder 194a comprises a holding portion 204a for holding the first side wall spew trimming cutter 201a, and a boss portion 205a formed at a position remote upwardly of a horizontal center line of the holding portion 204a to be retained through the pin member 191a by the cylindrical portion 188a of the supporting bracket 185a. The holding portion 204a is formed at its central portion with a bore 206a to expose the forward cutting portion of the first side wall spew trimming cutter 202a. A side extension 207a is integrally formed extending from the side face of the holding portion 204a and has a thickness tapered toward the forward end thereof. The holding portion 204a is formed at the underside thereof along the bore 206a with a dove-tail groove 208a which is securely fitted with the first side wall spew trimming cutter 202a so as to reliably hold it by the first side wall spew trimming cutter holder 194a. The first side wall spew trimming cutter holder 194a is thus formed having a rotational axis above the horizontal central line thereof so that it is preferably moved along the curved portion formed on the end of the tread surface. The extension 207a gives rise to such an advantage especially for a block pattern tire and the like that a number of blocks formed on the side wall surface may not be cut and damaged by the trimming cutter 202a by the reason that the extension 207a bridges and overruns adjacent two blocks even if the trimming cutter 202a is being vibrated on the side wall surface. Therefore, the extension 207a ensures to avoid the finished tire in quality from being decreased. On the outer surface of the bracket 178a is securely mounted an upstanding post 209a onto which a pair of photoelectric switches 210a and 211a are slidably attached in spaced relation to produce respective signals for operating the air cylinders 166a, 167a and 168a and for stopping the electric motor 142. The positions of the photoelectric switches 210a and 211a are adjustable along the upstanding post 209a.

The front plate 156 is thus moved by the electric motor 142 from an initial operating position I shown in phantom lines in FIG. 21 to a final operating position, where the photoelectric switch 211a detects the bead surface of the tire T and vice versa so that the movable side wall spew trimming cutter supporting arm 157, the first, second and third side wall spew trimming cutters 202a, 203a and 201a and the other elements associated therewith are moved to assume the respective positions in unison with the supporting arm 157. The first, second and third side wall spew trimming cutters 202a, 203a and 201a are thus moved by the action of the air cylinders 166a, 167a and 168a, respectively, from initial operating positions J, K and L shown in FIG. 20 to final operating positions, where the first, second and third side wall spew trimming cutters 202a, 203a and 201a are in contact with respective positions of the side wall of the tire T, and vice versa. The air cylinders 166a, 167a and 168a are also filled with an oil below a pressure of 7kg/cm² so that oscillations or vibrations of the first, second and third side wall spew trimming cutters 202a, 203a and 201a are decreased and horizontal movements of the first, second and third side wall spew trimming cutters 202a, 203a and 201a are effected smoothly and at respective constant speeds. The oil to be filled in the air cylinders 166a, 167a and 168a may be replaced by any other suitable uncompressible liquid.

The combination of the first, second and third rockable arms 175a, 176a and 177a, the air cylinders 166a, 167a and 168a, the first, second and third side spew wall trimming cutter holders 194a, 195a and 196a, the first, second and third side wall spew trimming cutters 201a, 202a and 203a and the associated elements on the supporting arm 157 constitutes as a whole a side wall spew trimming cutter arrangement which is generally indicated at 212a in FIG. 20. An additional side wall spew trimming cutter arrangement generally indicated at 212b is also mounted on the movable side wall spew trimming cutter supporting arm 157 in symmetrical relation to the foregoing side wall spew trimming cutter arrangement 212a with respect to the first equatorial plane 8 and is constructed substantially identically to the trimming cutter arrangement 212a so that the similar constitutional elements or parts of the additional side wall spew trimming cutter arrangement 212b are indicated by the same reference numerals each bearing a mark b. The function of the additional side wall spew trimming cutter arrangement 212b is also substantially the same as that of the side wall spew trimming cutter arrangement 212a. The detailed constitutional description will thus not be made hereinafter regarding the additional side wall spew trimming cutter arrangement 212b.

The operation to cut and remove spews on the outer peripheral wall of the tire in the apparatus thus constructed and arranged will now be described with reference to FIGS. 1 to 26.

As shown particularly in FIGS. 1 and 2, a nonfinished tire T having a number of spews on the outer peripheral wall thereof is fed into the finishing apparatus through the rear columns 4a and 4b with its rotational axis being substantial horizontal to be mounted on the receiving rollers 21 and 21'. When a suitable detecting device such as photoelectric switch not shown in the drawings detects the tire T received at a predetermined position by the receiving rollers 21 and 21', the roller rotating electric motor 25 on the base plate structure 2 is energized to rotate by an electric signal from the above detecting device so that the receiving roller 21 is rotated through the V-shaped belt pulley 26, the V-shaped belt 27 and V-shaped belt pulley 23, causing the tire T to be rotated while being supported by the receiving rollers 21 and 21'. At the same time, compressed air is exhausted from the pressing roller air cylinders 16 and 16' to cause the pressing rollers 15 and 15' to assume the final operating position B shown in phantom lines in FIGS. 1 and 3 and shown in solid lines in FIG. 2 from the initial operating positions A shown in solid lines in FIGS. 1 and 3 to pressingly hold the tire T in cooperation with the receiving rollers 21 and 21' for preventing any up and down motion of the tire T. On the other hand, at the same time as that the receiving roller 21 is rotated and the pressing rollers 15 and 15' descend to hold and rotate the tire T, the centering roller air cylinders 43 and 43' are actuated to move the centering rollers 38a, 38a', 38b and 38b' from the initial operating positions C shown in phantom lines in FIG. 4 to the final operating positions C' where the centering rollers 38a, 38a', 38b and 38b' are brought into contact with the side wall surfaces of the tire T, so that the equatorial plane of the tire T is made in alignment with the first equatorial plane 8 of the stationary frame structure 1 allowing the tire T to be rotated under a stable condition. When the stable rotation of the tire T is attained, the first tread spew trimming cutter air cylinder 51 shown in FIG. 5 is actuated to cause the piston rods 51a to be projected so that the first tread spew trimming cutter 55 is moved from the initial operating position D shown in FIG. 5 to the final operating position where the cutter 55 is brought into contact with the central tread surface of the tire T. Therefore, the cutter 55 trimmingly cuts the annular fin which is formed on the central tread surface of the tire T by a gap between two divided tire molds. When the first tread spew trimming cutter air cylinder 51 is actuated, the electric motor 73 shown in FIG. 12 is energized to rotate to cause the screw shaft 70 to be rotated through the V-shaped belt pulley 74, V-shaped belt 75 and the V-shaped belt pulley 72, so that the movable frame structure 80 descends from the initial operating position E shown in solid lines in FIGS. 1, 2 and 12 to the final operating position where the photoelectric switches 123a and 123b shown in FIGS. 14 and 15 detect the tread surface of the tire T. When the photoelectric switches 123a and 123b detect the tread surface of the tire T, the photoelectric switches 123a and 123b produce an electric signal to stop the electric motor 73 and to operate the brake 71 so that the descend of the movable frame structure 80 is stopped. When the descend of the movable frame structure 80 is stopped, the air cylinders 107a and 107b are simultaneously actuated to cause the piston rods 108a and 108b to be projected so that the third tread spew trimming cutters 121a and 121b are moved from the initial operating positions G shown in FIG. 14 to the final operating positions where the cutters 121a and 121b come to be in contact with the tread side surfaces of the tire T to trimmingly cut the spews formed thereon. Under these conditions, the air cylinders 100a and 100b are simultaneously actuated to cause the piston rods 101a and 101b to be projected so that the brackets 97a and 97b are moved away from each other. The third tread spew trimming cutters 121a and 121b are thus moved horizontally away from each other to assume the final operating positions H shown in phantom lines in FIG. 14 while being in contact with the tread side surfaces of the tire T. After the third tread spew trimming cutters 121a and 121b are moved sufficiently away from each other, the air cylinder 88 is actuated to cause the piston rod 88a to be projected so that the second tread spew trimming cutter 94 is moved from the initial operating position F shown in FIG. 16 to the final operating position where the cutter 94 is brought into contact with the central portion of the tread surface of the tire T to trimmingly cut spews thereon. The spews projected from the tread surface of the tire T are thus completely cut and removed by the first, second and third tread spew trimming cutters 55, 94, 121a and 121b to complete a finishing operation on the entire tread surface of the tire T. Following completion of such a finishing operation of the entire tread surface of the tire T, the air cylinders 51 is again actuated to cause the piston rod 51a to be retracted so that the first tread spew trimming cutter 55 resumes the initial operating position D shown in FIG. 5. Simultaneously, the air cylinder 88 is actuated to cause the piston rod 88a to be retracted so that the second tread spew trimming cutter 94 resumes the initial operating position F shown in FIG. 16. On the other hand, the air cylinders 100a, 100b, 107a and 107b are again actuated to cause the piston rods 101a, 101b, 108a and 108b to be retracted at the same time to the actuation of the air cylinders 51 and 88 so that the third tread spew trimming cutters 121a and 121b resume the initial operating position G shown in FIG. 14. Upon the resumption of the first, second and third tread spew trimming cutters 55, 94, 121a and 121b, the electric motor 73 is again energized to reversely rotate so that the movable frame structure 80 resumes the initial operating position E shown in FIG. 12.

In unison with the tread surface finishing operation, a side wall surfaces finishing operation is carried out. Namely, when the stable rotation of the tire T is attained, the electric motor 142 is energized to rotate transmitting its rotational torque to the screw shaft 132 through the spur gear 143, the spur gears 138a and 138b, the clutches 136a and 136b, the spur gears 140a and 140b, the spur gears 147a and 147b, the sprocket wheels 146a and 146b, the endless chain 148, and the sprocket wheel 133, so that the front plate 156 is moved upwardly from the initial operating position I shown in phantom lines in FIG. 21 to the final operating position where the photoelectric switches 210a and 210b detect the tread surface of the tire T so that the movable side wall spew trimming cutter supporting arm 157, the first, second and third side wall spew trimming cutters 202a, 202b, 203a, 203b, 201a and 201b and the other elements associated therewith are moved to assume the respective positions. When the photoelectric switches 210a and 210b detect the tread surface of the tire T, the clutches 136a and 136b are actuated to stop transmitting the rotational torque of the electric motor 142 to the screw shaft 132 so that the upward movement of the supporting arm 157 is temporaly stopped. Following the temporal stoppage of the supporting arm 157, the air cylinders 166a, 166b, 167a and 167b are simultaneously actuated to cause the piston rods 169a, 169b, 170a and 170b to be projected, so that the first side wall spew trimming cutters 202a, 202b and the second side wall spew trimming cutters 203a, 203b are moved from the respective initial operating positions J and K to the respective final operating positions where the cutters 202a, 202b, 203a and 203b are brought into contact with the respective side wall surfaces of the tire T to cut and remove the spews thereon. When the first side wall spew trimming cutters 202a, 202b and the second side wall spew trimming cutters 203a, 203b are brought into contact with the respective side wall portions of the tire T, the clutched 136a and 136b are again actuated to transmit the rotational torque of the electric motor 142 to the screw shaft 132 so that the supporting arm 157 are again moved upwardly. Upon the ascend of the supporting arm 157 by a predetermined distance, the air cylinders 168a and 168b are actuated to cause the piston rods 171a and 171b to be projected so that the third side wall spew trimming cutters 201a and 201b are moved from the initial operating positions L to the final operating positions where the cutters 201a and 201b are brought into contact with the respective side wall portions of the tire T to cut and remove the spews thereon. The trimming operation of the third side wall spew trimming cutters 201a and 201b are performed jointly with the first and second side wall spew trimming cutters 202a, 202b, 203a and 203b while the supporting arm 157 continues to move upwardly. When the photoelectric switches 211a and 211b detect the bead surfaces of the tire T, the electric motor 142 is de-energized to stop the ascend the supporting arm 157, and the air cylinders 166a, 166b, 167a, 167b, 168a and 168b are again actuated to cause the first, second and third side wall spew trimming cutters 202a, 202b, 203a, 203b, 201a and 201b to resume the respective initial operating positions J, K and L. Upon the resumption of the trimming cutters 202a, 202b, 203a, 203b, 201a and 201b, the electric motor 142 is again energized to reversely rotate to move the front plate 156 to the initial operating position I, so that the first, second and third side wall spew trimming cutters 202a, 202b, 203a, 203b, 201a and 201b, the supporting arm 157 and the other associated elements are moved downwardly to resume the respective initial positions. The spews projected from the side wall surfaces of the tire T are thus completely cut and removed by the first, second and third side wall spew trimming cutters 202a, 202b, 203a, 203b, 201a and 201b to complete a finishing operation on the entire side wall surfaces of the tire T. Following the completion of the side wall finishing operation, the centering roller air cylinders 43 and 43' are actuated to cause the centering rollers 38a, 38a', 38b and 38b' to resume the initial operating positions C. At the same time, the electric motor 25 of the driving mechanism 29 is stopped and compressed air is fed into the receiving roller air cylinders 16 and 16' to cause the pressing rollers 15 and 15' to resume the initial operating positions A. The finished tire T is then pushed out of the finishing apparatus through the fore columns 3a and 3b by a suitable pushing device (not shown) to be delivered to the following process.

A single and complete cycle of operation to trimmingly cut and remove spews on the tread and side wall surfaces to finish a tire in the apparatus embodying the present invention has been described. A number of tires will be finished through repetition of such cycles.

Figure 27:
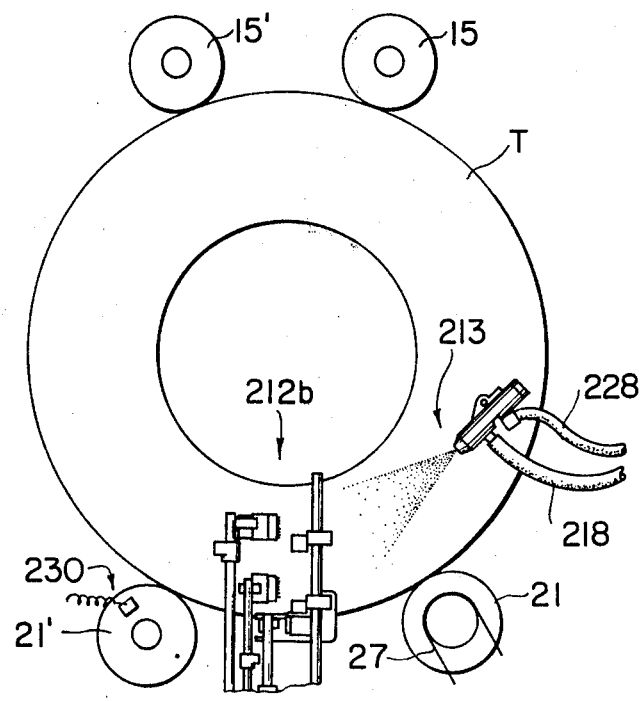
FIG. 27 is a schematic view of another embodiment of the present invention.

In order to maintain the sharpness of the trimming cutter, it is preferable to spray a liquid onto the outer peripheral wall of the tire T, immediately prior to the cutting actions by the first, second and third tread spew trimming cutters 55, 94, 121a and 121b and the first, second and third side wall spew trimming cutters 203a, 203b, 202a, 202b, 201a and 201b. In view of this reason, there is provided a spraying device opposing to each of the side wall surfaces and the tread surface of the tire T according to another embodiment of the present invention. For simplifying the construction and function of the spraying device, there is schematically shown in FIG. 27 only one of the spraying device, generally indicated at 213, which is disposed in the vicinity of the side wall surface of the tire T and the additional side wall spew trimming cutter arrangement 212b.

Figure 28:
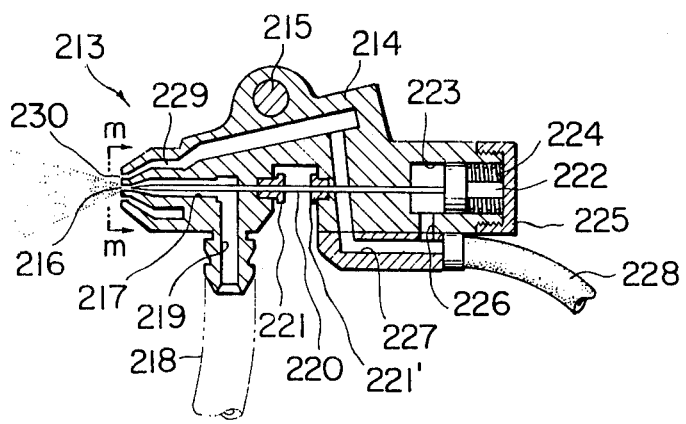
FIG. 28 is a cross-sectional view of a spraying device employed in the another embodiment of the present invention.
Figure 29:
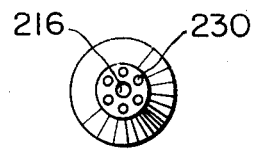
FIG. 29 is a front view as seen from the lines m—m in FIG. 28.

As shown in FIGS. 28 and 29, the spraying device 213 comprises a body 214 which is supported by the stationary frame structure 1 through a supporting rod 215. The body 214 has at its forward end a liquid nozzle 216 which is pneumatically communicated with a straight liquid passage 217. A flexible liquid pipe 218 is connected at one end to a liquid source (not shown) and at the other end to a liquid passage 219 which is formed in the body 214 in pneumatical communication with the straight liquid passage 217. A needle 220 is slidably retained by the body 214 so as to extend in the straight liquid passage 217, while having a forward end opposing to and adjacent the liquid nozzle 216. The needle 220 has a longitudinally intermediate portion hermetically sealed by seal rings 221 and 221' and a rear end securely connected to a piston 222 which is accommodated in a cylinder 223 formed in the rear portion of the body 214. The piston 222 is at all times urged forwardly by a coil spring 224 which is accommodated in the rear portion of the cylinder 223 and held by a lid 225 threadedly engaged with the rear portion of the body 214. A port 226 is formed in the body 214 at the forward end of the cylinder 223 in pneumatical communication with an air passage 227 which is also formed in the body 214 and connected at one end to a flexible air pipe 228 leading to a compressed air source. The other end of the air passage 227 is pneumatically communicated to an annular air passage 229 formed at the forward portion of the body 214 surrounding the straight liquid passage 217. A plurality of air nozzles 230 is formed at the forward end of the body 214 surrounding the liquid nozzle 216 and pneumatically communicating with the annular air passage 229.

Prior to the cutting operation during rotation of the tire T, compressed air is introduced into the air passage 227 through the flexible air pipe 228. At this time, the compressed air enters the cylinder 223 through the port 226 to move the piston 222 rearwardly against the coil spring 224 so that the needle 220 is moved away from the liquid nozzle 216 to open the liquid nozzle 216. The compressed air is spouted out of the air nozzle 230 through the air passage 227 and the annular air passage 229. On the other hand, a liquid is concurrently fed into the liquid passages 217 and 219 through the flexible liquid pipe 218 so that the liquid is jetted out of the liquid nozzle 216 to be sprayed onto the side wall surface of the tire T. After the cutting operation is completed, the supply of compressed air and liquid is simultaneously stopped so that the piston 222 and the needle 220 are urged forwardly by the coil spring 224 to close the liquid nozzle 216 with the forward end of the needle 220. The other side wall surface and the tread surface of the tire are required to be sprayed by other spraying devices having the same construction. Three spraying devices are thus provided in total in the finishing apparatus of the present invention.

According to spraying of the liquid onto the outer peripheral wall of the tire in this embodiment, spews are completely removed out of the outer peripheral surface of the tire while maintaining the sharpness of the trimming cutter for a long time and enhancing the durability thereof. As a liquid it is possible to use such a liquid as to have low viscosity, be quickly dryable, readily slidable, non-corrosive to tires as well as cheaper. Water is most preferable for such a liquid, however, any other kinds of liquid may be used in lieu of water. The position to be occupied by the spraying device is most preferable immediately foward of the trimming cutter, and spaced away of the forward end of the trimming cutter by a distance of about 2cm. The spraying device may be located at any other positions adjacent the trimming cutter as long as the liquid is sprayed onto the peripheral wall position forwardly of the trimming cutter.

For the purpose of preventing the driving mechanical parts for rotating the tire and holding mechanical parts for holding the trimming cutters from being damaged upon the trimming cutters stabbing the outer peripheral wall of the tire, a detecting device generally designated at 230 is provided in the vicinity of the receiving roller 21' in FIG. 27 so that the rotating mechanism may be stopped upon abrupt revolutions decreasing of the receiving roller 21' below a predetermined level in still another embodiment of the present invention.

Figure 30:
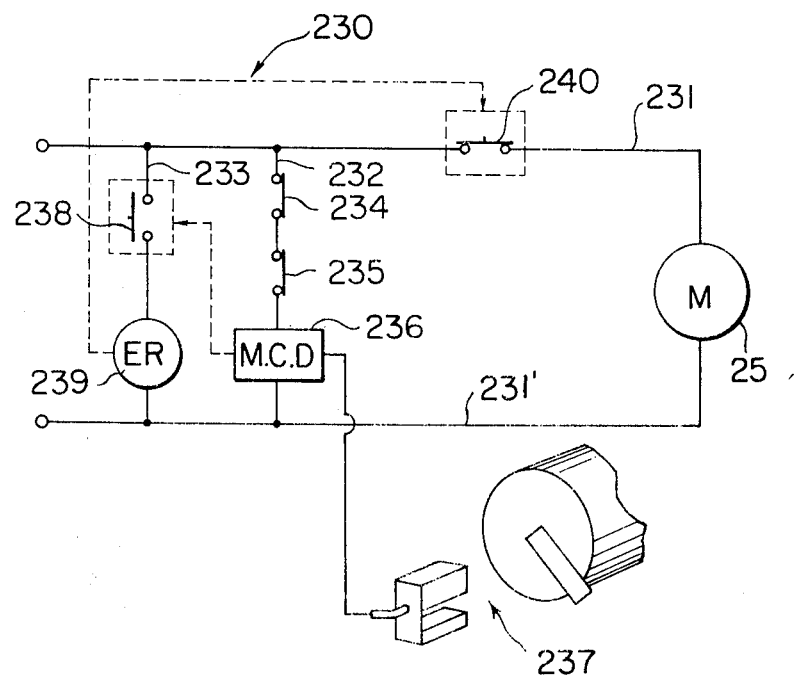
FIG. 30 is a circuit of a detecting device employed in still another embodiment of the present invention for stopping a tire rotating mechanism upon abrupt revolutions decresing of the tire below a predetermined level.

The detecting device 230 comprises a circuit as shown in FIG. 30 in which the electric motor 25 of the driving mechanism 29 is connected to one ends of lines 231 and 231' having the other ends connected to a power source not shown. To the lines 231 and 231' are connected both ends of two lines 232 and 233 in parallel relation to the electric motor 25. On the line 232 is provided switches 234, 235 and a revolutions detecting means 236 in series. The switch 234 is closed by a signal produced upon the tire being received on the receiving rollers 21 and 21', while the switch 235 is closed upon rotation of the electric motor 25. The revolutions detecting means 236 is adapted to deliver a signal to a following switch by detecting revolutions of the receiving roller 21' below a predetermined level. As a sensor, generally designated at 237, of the revolutions detecting means 236 is preferable a non-contacting type such as photoelectric means, electromagnetic means and the like. The output signal of the revolutions detecting means 236 may be represented in either digital or analogue display. On the line 233 is provided in series a switch 238 and a relay 239, the former of which is normally opened but closed by the signal delivered from the revolutions detecting means 236 to actuate the relay 239. A normally closed emergency switch 240 is provided on the line 231 in series to the electric motor 25 and is opened upon receipt of a signal produced by the relay 239.

When one or more trimming cutters thus stab the outer wall surface of the tire to cause the revolutions of the tire to be below a predetermined value, the revolutions detecting means 236 produces a signal since there causes a difference between the revolutions and the predetermined value in accordance with the revolutions detected by the sensor 237. The switch 238 is then closed by the signal of the detecting means 236 to actuate the relay 239 so that the emergency switch 240 is opened to abruptly stop the electric motor 25. In this instance, an alarm buzzer may be provided in the circuit to be actuated for informing operators about stabbing of the trimming cutters.

According to the abrupt stopping of the electric motor and the driven receiving roller upon the stabbing of the outer wall surface by the trimming cutters in this embodiment of the present invention, overloads on the driving mechanical parts for rotating the tire and holding mechanical parts for holding the trimming cutters are eliminated to prevent damages therefrom. The detecting device 230 may be mounted directly on the receiving roller 21'.

What is claimed is:

1. A tire finishing apparatus for trimming and removing spews formed on the outer peripheral wall of a cured time during a vulcanizing process, comprising:
    a tire holding mechanism including at least three rollers adapted to be in contact with the outer peripheral wall of said tire with its rotational axis substantially horizontal to prevent said tire from being vibrated during rotation thereof;
    a tire rotating mechanism driving at least one of said rollers of said tire holding mechansim to rotate said tire about its rotational axis while being held by said tire holding mechanism;
    a stationary frame structure;
    a movable frame structure vertically movably mounted on said stationary frame structure;
    a driving mechanism for vertically moving said movable frame structure;
    an additional movable frame structure disposed below said movable frame structure and vertically movably mounted on said stationary frame structure;
    an additional driving mechanism for vertically moving said additional movable frame structure; and
    a spew trimming cutter mechanism comprising a tread spew trimming cutter arrangement disposed opposite the tread surface of said tire, said tread spew trimming cutter arrangement including a rockable arm having one end pivotally connected to and supported by said stationary frame structure, a trimming cutter holder rotatably mounted on the other end of said rockable arm, a tread spew trimming cutter substantially in the form of a comb held by said trimming cutter holder, and actuator means mounted on said stationary frame structure to cause said rockable arm to be swung about its one end so that said tread spew trimming cutter is contactable with the tread surface of said tire for trimming said spews projected from the tread surface of said tire, an additional tread spew trimming cutter arrangement disposed opposite the tread surface of said tire, said additional tread spew trimming cutter arrangement including a movable bracket mounted on the underside of said movable frame structure to be movable in a direction substantially parallel to the rotational axis of said tire, a bracket moving device including an air cylinder, mounted on said movable frame structure, including a piston rod pivotally connected to said movable bracket for moving said movable bracket in a direction substantially parallel to the rotational axis of said tire and which is filled with an incompressible liquid, an additional rockable arm located beneath said movable frame structure and having one end pivotally connected to and supported by said movable bracket, an additional trimming cutter holder rotatably mounted on the other end of said additional rockable arm, an additional tread spew trimming cutter substantially in the form of a comb held by said additional trimming cutter holder, and additional actuator means for swinging said additional rockable arm about its one end so that said additional tread spew trimming cutter is contactable with the tread surface of said tire for trimming said spews projected from the tread surface of said tire upon downward movement of said movable frame structure by said driving mechanism and is axially moved along the tread surface of said tire upon movement of said movable bracket by the action of said bracket moving device for trimming said spews projected from the tread surface of said tire along its entire axial extent, said additional actuator means including an air cylinder, mounted on said movable bracket, including a piston rod pivotally connected to a longitudinally intermediate portion of said additional rockable arm and which is filled with an incompressible liquid, and a pair of side wall spew trimming cutter arrangements disposed opposite and spaced from each other, each of said side wall spew trimming cutter arrangements including a further additional rockable arm having a longitudinally intermediate portion pivotally connected to and supported by said additional movable frame structure, a further additional trimming cutter holder pivotally mounted on one end of said further additional rockable arm by a pivotal pin substantially parallel to the equatorial plane of said tire, a side wall spew trimming cutter substantially in the form of a comb held by said further additional trimming cutter holder, and further additional actuator means for swinging said further additional rockable arm about its intermediate portion so that said side wall spew trimming cutter is contactable with the side wall surface of said tire for trimming said spews projected from the side wall surface of said tire and is radially moved along the side wall surface of said tire upon vertical movement of said additional movable frame structure by the action of said additional driving mechanism for trimming said spews projected from the side wall of said tire along its entire radial extent, said further additional actuator means including an air cylinder, pivotally mounted on said additional movable frame structure, including a piston rod pivotally connected to the other end of said further additional rockable arm and which is filled with an incompressible liquid, said tread spew trimming cutter, said additional tread spew trimming cutter and said side wall spew trimming cutter each including a number of sharp point edges and a stepped portion formed on the reverse side of said trimming cutter rearwardly of said sharp point edges so as to produce a small gap between said sharp point edges and said tread surface of said tire.

2. A tire finishing apparatus as set forth in claim 1, in which said tire holding mechanism includes a pair of tire receiving rollers of substantially cylindrical shape disposed in spaced relation to each other along the tread surface of said tire and each having a rotational axis substantially parallel to said rotational axis of said tire, a pair of tire pressing rollers of hand-drum shape disposed above said tire receiving rollers and in spaced relation with each other and movable toward and away from said tire receiving rollers to be brought into contact with the outer peripheral wall of said tire for preventing up and down motion of said tire during rotation thereof in cooperation with said tire receiving rollers and each having a rotational axis substantially parallel to said rotational axis of said tire, centering means including a first pair of tire centering rollers of substantially spherical shape and a second pair of tire centering rollers also of substantially spherical shape disposed in spaced relation with said first pair of tire centering rollers along the outer peripheral wall of said tire, each pair of said first and second pairs of tire centering rollers being disposed in spaced opposed relation to each other along the rotational axis of said tire and being movable toward and away from each other to be brought into contact with the side walls of said tire for preventing the equatorial plane of said tire from being vibrated during rotation thereof, each of said tire centering rollers having a rotational axis substantially parallel with the radial direction of said tire, a pair of tire pressing roller actuator means for moving said tire pressing rollers toward and away from said tire receiving rollers, first tire centering roller actuator means for moving said first pair of tire centering rollers toward and away from each other, and second tire centering roller actuator means for moving said second pair of tire centering rollers toward and away from each other, said tire rotating mechanism driving at least one of said tire receiving rollers to rotate said tire about its rotational axis while being held by said tire holding mechanism.

3. A tire finishing apparatus as set forth in claim 1, in which each of said tire pressing roller actuator means includes an air cylinder mounted on a stationary frame structure and including a piston rod rotatably supporting said tire pressing roller; each of said first and second tire centering roller actuator means including an air cylinder mounted on said stationary frame structure and having a piston rod operably connected to said tire centering rollers.

4. A tire finishing apparatus as set forth in claim 1, in which said pivotal pin is positioned above the horizontal center line of said further additional trimming cutter holder.

5. A tire finishing apparatus as set forth in claim 1, in which said stepped portion is formed on the reverse side of said spew trimming cutter at a position ranging from 3.0mm to 5.0mm rearwardly spaced from said sharp point edges and has a height ranging from 0.1mm to 0.5mm.

6. A tire finishing apparatus as set forth in claim 1, which further comprises spraying means in the vicinity of said tire for spraying a liquid around the outer peripheral wall to be trimmingly cut by said spew trimming cutter mechanism for promoting the trimming action of said spew trimming cutter mechanism.

7. A tire finishing apparatus as set forth in claim 1 in which said receiving rollers includes at least a free roller which is not driven in rotation by said rotating mechanism; and which further includes detecting means in the vicinity of said free roller for producing an electrical signal to stop said tire rotating mechanism upon abrupt decrease of speed of rotation of said free roller below a predetermined level.

8. A tire finishing apparatus for trimming and removing spews formed on the outer peripheral wall of a cured tire during a vulcanizing process, comprising:
a tire holding mechanism including a pair of tire receiving rollers of substantially cylindrical shape disposed in spaced relation from each other along the tread surface of said tire and each having a rotational axis substantially parallel to the rotational axis of said tire, a pair of tire pressing rollers of substantially hand-drum shape disposed above said tire receiving rollers and in spaced relation with each other and movable toward and away from said tire receiving rollers to be brought into contact with the outer peripheral wall of said tire for preventing up and down motion of said tire during rotation thereof in cooperation with said tire receiving rollers and each having a rotational axis substantially parallel to said rotational axis of said tire, centering means including a first pair of tire centering rollers of substantially spherical shape and a second pair of tire centering rollers also of substantially spherical shape disposed in spaced relation with said first pair of tire centering rollers along the outer peripheral wall of said tire, each pair of said first and second pairs of tire centering rollers being disposed in spaced opposed relation from one another along the rotational axis of said tire and being movable toward and away from each other to be brought into contact with the side walls of said tire for preventing the equatorial plane of said tire from being vibrated during rotation thereof, each of said tire centering rollers having a rotational axis substantially parallel with the radial direction of said tire, a pair of tire pressing roller actuator means for moving said tire pressing rollers toward and away from said tire receiving rollers, first tire centering roller actuator means for moving said first pair of tire centering rollers toward and away from each other, and second tire centering roller actuator means for moving said second pair of tire centering rollers toward and away from each other;

tire rotating mechanism driving at least one of said tire receiving rollers to rotate said tire about its rotational axis while being held by said tire holding mechanism;

stationary frame structure;

movable frame structure vertically movably mounted on said stationary frame structure;

driving mechanism for vertically moving said movable frame structure;

ι additional movable frame structure disposed below said movable frame structure and vertically movably mounted on said stationary frame structure;

ι additional driving mechanism for vertically moving said additional movable frame structure; and spew trimming cutter mechanism comprising a first tread spew trimming cutter arrangement which includes a first rockable arm having one end pivotally connected to and supported by said stationary frame structure, a first trimming cutter holder rotatably mounted on the other end of said first rockable arm, a first tread spew trimming cutter substantially in the form of a comb held by said first trimming cutter holder, and first actuator means mounted on said stationary frame structure to cause said first rockable arm to be swung about its one end so that said first tread spew trimming cutter is contactable with the tread surface of said tire for trimming said spews projected from the tread surface of said tire, a second tread spew trimming cutter arrangement which includes a second rockable arm having one end pivotally connected to and supported by said movable frame structure, a second trimming cutter holder rotatably mounted on the other end of said second rockable arm, a second tread spew trimming cutter substantially in the form of a comb held by said second trimming cutter holder, second actuator means mounted on said movable frame structure to cause said second rockable arm to be swung about its one end so that said second tread spew trimming cutter is contactable with the tread surface of said tire for trimming said spews projected from the tread surface of said tire, a third tread spew trimming cutter arrangement which includes a movable bracket mounted on the underside of said movable frame structure to be movable in a direction substantially parallel to the rotational axis of said tire, a bracket moving device including an air cylinder, mounted on said movable frame structure, including a piston rod pivotally connected to said movable bracket to move said movable bracket in a direction substantially parallel to the rotational axis of said tire and which is filled with an incompressible liquid, a third rockable arm located beneath said movable frame structure and having one end pivotally connected to and supported by said movable bracket, a third trimming cutter holder rotatably mounted on the other end of said third rockable arm, a third tread spew trimming cutter substantially in the form of a comb held by said third trimming cutter holder, and third actuator means for swinging said third rockable arm about its one end so that said third tread spew trimming cutter is contactable with the tread surface of said tire for trimming said spews projected from the tread surface of said tire upon downward movement of said movable frame structure by said driving mechanism and is axially moved along the tread surface of said tire upon movement of said movable bracket by the action of said bracket moving device for trimming said spews projected from the tread surface of said tire along its entire axial extent, said third actuator means including an air cylinder, mounted on said movable bracket, including a piston rod pivotally connected to a longitudinally intermediate portion of said third rockable arm and which is filled with an incompressible liquid, and a pair of side wall spew trimming cutter arrangements disposed in opposed and spaced relation from one another, each of which includes fourth, fifth and sixth rockable arms having respective longitudinally intermediate portions pivotally connected to and supported by said additional movable frame structure in stepped relation with each other along the equatorial plane of said tire; fourth, fifth and sixth trimming cutter holders pivotally mounted on respective ends of said fourth, fifth and sixth rockable arms by respective pivotal pins substantially parallel to the equatorial plane of said tire; first, second and third side wall spew trimming cutters substantially in the form of a comb held by said respective trimming cutter holders, and fourth, fifth and sixth actuator means for swinging said fourth, fifth and sixth rockable arms about their respective longitudinally intermediate portions so that said first, second and third side wall spew trimming cutters are contactable with the side wall surface of said tire for trimming said spews projected from the side wall surface of said tire and are radially moved along the side wall surface of said tire upon vertical movement of said additional movable frame structure by the action of said additional driving mechanism for trimming said spews projected from the side wall of said tire along its entire radial extent, said fourth, fifth and sixth actuator means respectively including air cylinders, pivotally mounted on said additional movable frame structure, which include piston rods respectively pivotally connected to the other ends of said fourth, fifth and sixth rockable arms and which are filled with an incompressible liquid, said first, second and third tread spew trimming cutters and said first, second and third side wall spew trimming cutters each including a number of sharp point edges and a stepped portion formed on the reverse side of said trimming cutter rearwardly of said sharp point edges so as to produce a small gap between said sharp point edges and said tread surface of said tire.

9. A tire finishing apparatus as set forth in claim 8, in which said first actuator means includes an air cylinder mounted on said stationary frame structure and including a piston rod pivotally connected to the longitudinally intermediate portion of said first rockable arm to cause said first rockable arm to be swung about its one end; said second actuator means including an air cylinder mounted on said movable frame structure and having a piston rod pivotally connected to the longitudinally intermediate portion of said second rockable arm to cause said second rockable arm to be swung about its one end.

10. A tire finishing apparatus as set forth in claim 8, in which said spew trimming cutter mechanism further comprises an additional third tread spew trimming cutter arrangement including an additional movable bracket mounted on the underside of said movable frame structure in opposed relation with said movable bracket to be movable toward and away from said movable bracket in a direction substantially parallel to the rotational axis of said tire, an additional bracket moving device including an air cylinder, mounted on said movable frame structure, including a piston rod pivotally connected to said additional movable bracket to move said additional movable bracket toward and away from said movable bracket in a direction substantially parallel to the rotational axis of said tire and which is filled with an incompressible liquid, an additional third rockable arm having one end pivotally connected to and supported by said additional movable bracket to be disposed opposite said third rockable arm of said third tread spew trimming cutter arrangement, an additional third trimming cutter holder rotatably mounted on the other end of said additional third rockable arm, an an additional third tread spew trimming cutter substantially in the form of a comb held by said additional third trimming cutter holder, and additional third actuator means for swinging said additional third rockable arm about its one end so that said additional third tread spew trimming cutter is contactable with the tread surface of said tire for trimming said spews projected from the tread surface of said tire, said additional third actuator means including an air cylinder mounted on said additional movable bracket in opposed relation with said air cylinder of said third actuator means, said air cylinder of the third actuator means including a piston rod pivotally connected to the longitudinally intermediate portion of said additional third rockable arm and filled with an incompressible liquid.

11. A tire finishing apparatus as set forth in claim 10, in which said third trimming cutter holder and said additional third trimming cutter holder each includes a boss portion rotatably supported on the other end of each of said third rockable arm and said additional rockable arm, a pair of retaining portions formed at both sides of said boss portion and having dove-tail grooves at their inner surfaces which are adapted to securely receive both sides of each of said third tread spew trimming cutter and said additional third tread spew trimming cutter and a comb portion having a multitude of parallel spaced slits formed at the forward portion of each of said third trimming cutter holder and said additional third trimming cutter holder, whereby said tire surface is prevented from being deeply cut by said third trimming cutter and said additional third trimming cutter.

12. A tire finishing apparatus as set forth in claim 8, which further comprises detecting means mounted on the underside of said movable frame structure for detecting the upper tread surface of said tire to produce an electric signal for stopping said driving mechanism when said movable frame structure assumes its lowest descent position.

13. A tire finishing apparatus as set forth in claim 8, in which said fourth trimming cutter holder includes a holding portion formed at its central portion with a bore to expose the forward cutting portion of said first side wall spew trimming cutter and having a thickness tapering toward the forward end thereof, said fourth trimming cutter holder being formed at the underside thereof along said bore with a dove-tail groove which is securely fitted with said first side wall spew trimming cutter, a side extension integrally extending from one side of said holding portion with a thickness tapered toward the forward end thereof, and a boss portion formed at a position upwardly remote from a horizontal center line of said holding portion to be retained through a pin member by the upper end of said fourth rockable arm, whereby said first side wall spew trimming cutter does not damage a number of blocks formed on the side wall surface by reason that said side extension bridges and overruns adjacent blocks even if said first side wall spew trimming cutter is being vibrated on the side wall surface.

14. A tire finishing apparatus as set forth in claim 8, in which said pivotal pin of said sixth trimming cutter holder is positioned above the horizontal center line of said sixth trimming cutter holders.

15. A tire finishing apparatus as set forth in claim 8, which further comprises a pair of detecting means mounted on said additional movable frame structure for detecting the lower tread surface and the lower bead surfaces of said tire to produce electric signals for stopping said additional driving mechanism when said additional movable frame structure assumes initial and final side wall spew trimming operating positions.

* * * * *